(12) United States Patent
Park et al.

(10) Patent No.: US 11,419,104 B2
(45) Date of Patent: Aug. 16, 2022

(54) SCRAMBLING SEQUENCE GENERATION FOR A MULTI-TRANSMIT RECEIVE POINT CONFIGURATION

(71) Applicant: QUALCOMM Incorporated, San Diego, CA (US)

(72) Inventors: Sungwoo Park, San Diego, CA (US); Makesh Pravin John Wilson, San Diego, CA (US); Tao Luo, San Diego, CA (US); Jing Sun, San Diego, CA (US); Xiaoxia Zhang, San Diego, CA (US); Arumugam Chendamarai Kannan, San Diego, CA (US); Vinay Chande, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 16/735,431

(22) Filed: Jan. 6, 2020

(65) Prior Publication Data

US 2020/0221432 A1 Jul. 9, 2020

Related U.S. Application Data

(60) Provisional application No. 62/789,327, filed on Jan. 7, 2019, provisional application No. 62/837,887, filed on Apr. 24, 2019.

(51) Int. Cl.
*H04W 72/04* (2009.01)
*H04L 5/00* (2006.01)
*H04L 1/18* (2006.01)

(52) U.S. Cl.
CPC ......... *H04W 72/042* (2013.01); *H04L 1/1812* (2013.01); *H04L 5/0048* (2013.01); *H04L 5/0007* (2013.01); *H04W 72/0466* (2013.01)

(58) Field of Classification Search
CPC ... H04W 72/042; H04W 76/27; H04W 88/02; H04W 88/08; H04W 72/0466;
(Continued)

(56) References Cited

U.S. PATENT DOCUMENTS

| 2011/0038310 A1* | 2/2011 | Chmiel | ............... H04L 27/2613 370/328 |
| 2014/0071918 A1* | 3/2014 | Park | ...................... H04L 5/0053 370/329 |

(Continued)

FOREIGN PATENT DOCUMENTS

WO    2014022860 A1    2/2014

OTHER PUBLICATIONS

FUJITSU : "DCI Format to Support CoMP in TM10," 3GPP Draft, 3GPP TSG RAN WG1 #70bis, R1-124124, DCI Format Comp, 3rd Generation Partnership Project (3GPP), Mobile Competence Centre, 650, Route Des Lucioles, F-06921, Sophia-Antipolis Cedex, France, vol. RAN WG1, No. San Diego, USA; Oct. 8, 2012-Oct. 12, 2012, Sep. 29, 2012 (Sep. 29, 2012), XP050662033, 4 pages, Retrieved from the Internet: URL: http://www.3gpp.org/ftp/tsg_ran/WG1_RL1/TSGR1_70b/Docs/ [retrieved on Sep. 29, 2012] * section 2 *.

(Continued)

*Primary Examiner* — Dady Chery
(74) *Attorney, Agent, or Firm* — Harrity & Harrity, LLP

(57) ABSTRACT

Various aspects of the present disclosure generally relate to wireless communication. In some aspects, a user equipment (UE) may receive, from a first transmit receive point (TRP), a downlink control information (DCI) communication, the UE being included in a multi-TRP configuration with the first TRP and a second TRP. The UE may determine information unique to the first TRP. The information unique to the first TRP may be at least one of associated with the DCI (Continued)

communication or included in the DCI communication. The UE may generate a downlink scrambling sequence initialization code, associated with the first TRP, based at least in part on the information unique to the first TRP. The UE may generate a downlink scrambling sequence, associated with the first TRP, based at least in part on the downlink scrambling sequence initialization code associated with the first TRP. Numerous other aspects are provided.

30 Claims, 23 Drawing Sheets

(58) Field of Classification Search
CPC ..... H04J 11/0053; H04J 13/00; H04L 1/1896; H04L 1/1822; H04L 5/0051; H04L 5/0053; H04L 25/03866; H04L 27/261; H04L 27/2626; H04L 1/1812; H04L 1/1864; H04L 5/0048; H04L 5/0007; H04L 5/0094
See application file for complete search history.

(56) References Cited

U.S. PATENT DOCUMENTS

| | | | |
|---|---|---|---|
| 2015/0230211 A1* | 8/2015 | You | H04W 72/04 370/330 |
| 2018/0270799 A1* | 9/2018 | Noh | H04L 1/1812 |

OTHER PUBLICATIONS

International Search Report and Written Opinion—PCT/US2020/012525—ISA/EPO—dated Oct. 6, 2020.
AT&T: "Impact of Beam Failure and Recovery on RLM Procedures", 3GPP Draft, 3GPP TSG-RAN WG2 #101bis, R2-1805957—Beam Failure and RLM, 3rd Generation Partnership Project (3GPP), Mobile Competence Centre, 650, Route Des Lucioles, F-06921 Sophia-Antipolis Cedex, France, vol. RAN WG2. No. Sanya, China, Apr. 16, 2018-Apr. 20, 2018, Apr. 6, 2018 (Apr. 6, 2018), XP051416313, pp. 1-4, Retrieved from the Internet: URL: http://www.3gpp.org/ftp/tsg%5Fran/WG2%5FRL2/TSGR2%5F101bis/Docs/, [retrieved on Apr. 6, 2018], Section 2.
Partial International Search Report—PCT/US2020/012525—ISAEPO—dated Jul. 22, 2020.
Huawei, et al., "Summary of AI: 7.2.8.2 Enhancements on Multi-TRP/Panel Transmission of Offline Discussion", 3GPP Draft, 3GPP TSG RAN WG1 Meeting #95, R1-1814003, MULTI-TRP_FL_RAN1 95_V7, 3RD Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 19, 2018 (Nov. 19, 2018), XP051494445, 32 pages, Retrieved from the Internet: URL: http://www.3gpp.org/ftp/tsg%5Fran/WG1%5FRL1/TSGR1%5F95/Docs/R1%2D1814003%2Ezip [retrieved on Nov. 19, 2018], Section 4.

\* cited by examiner

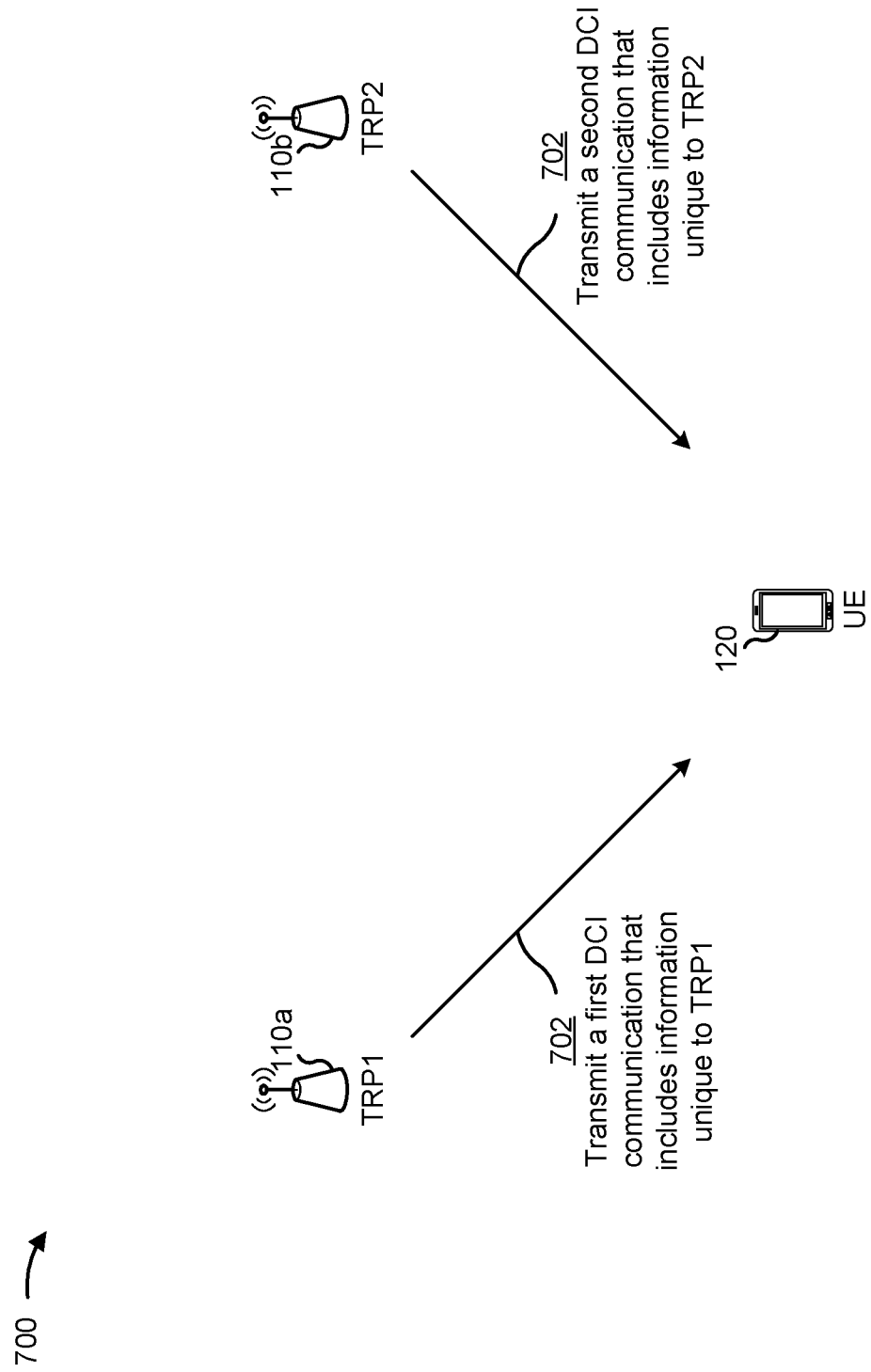

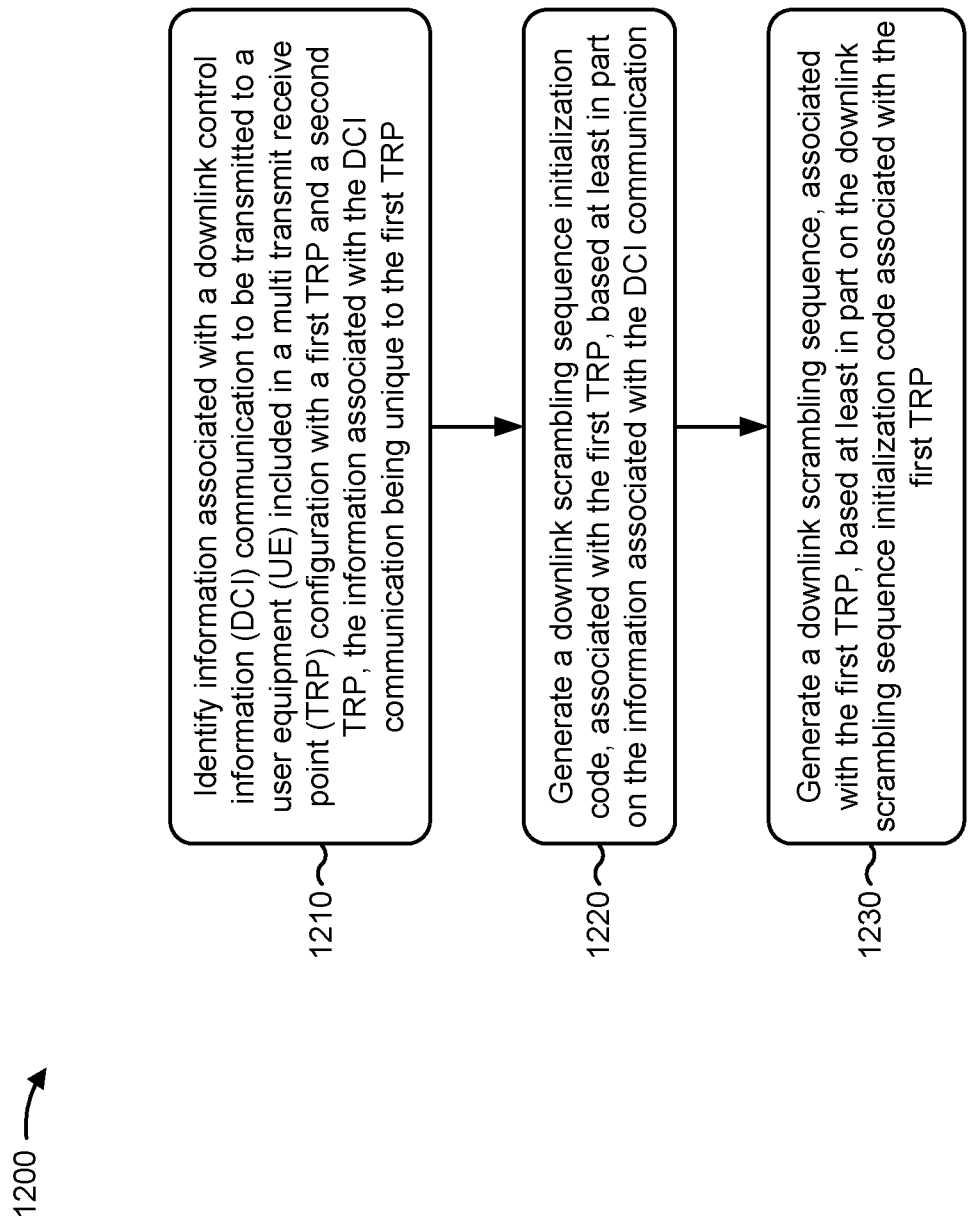

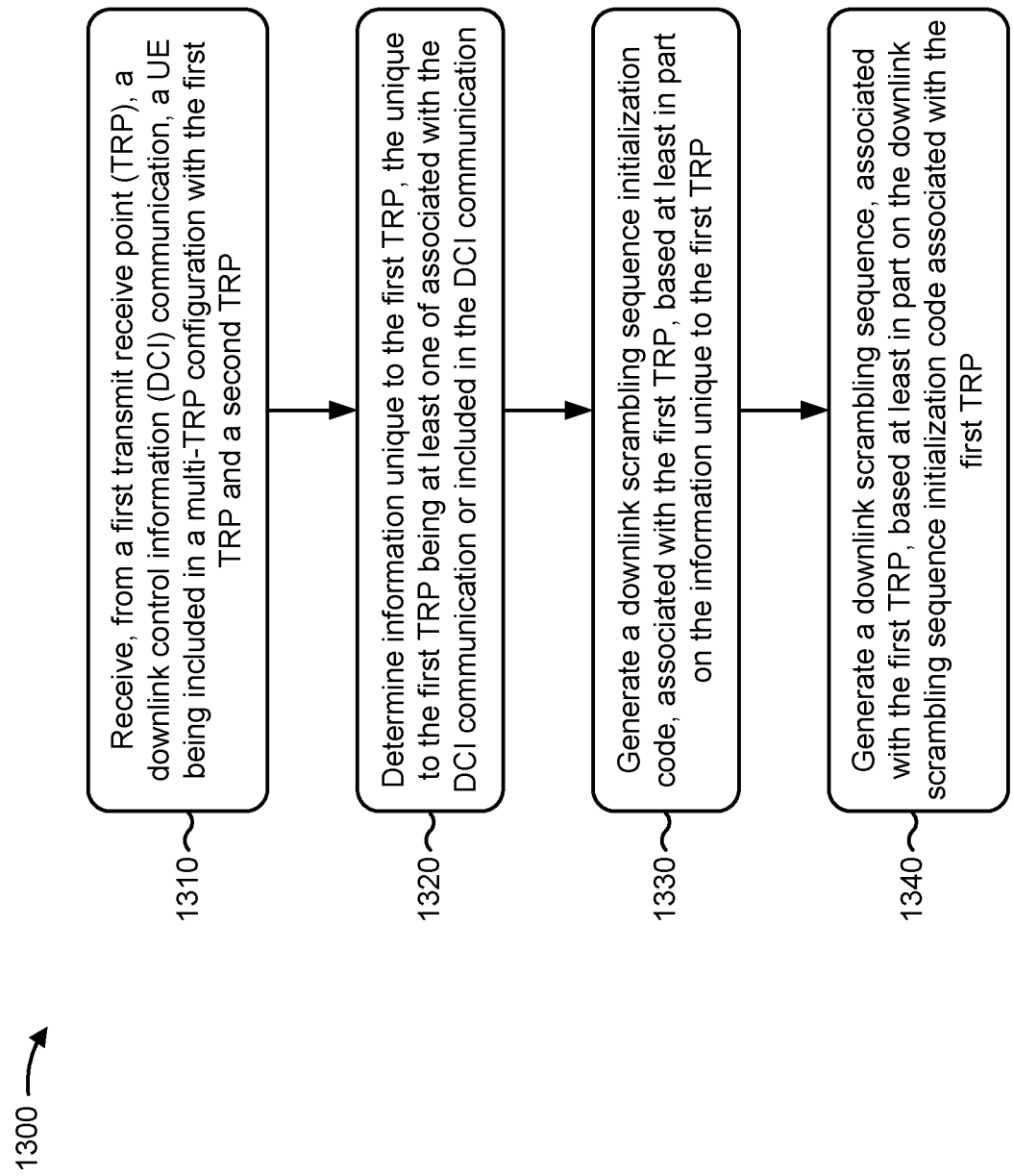

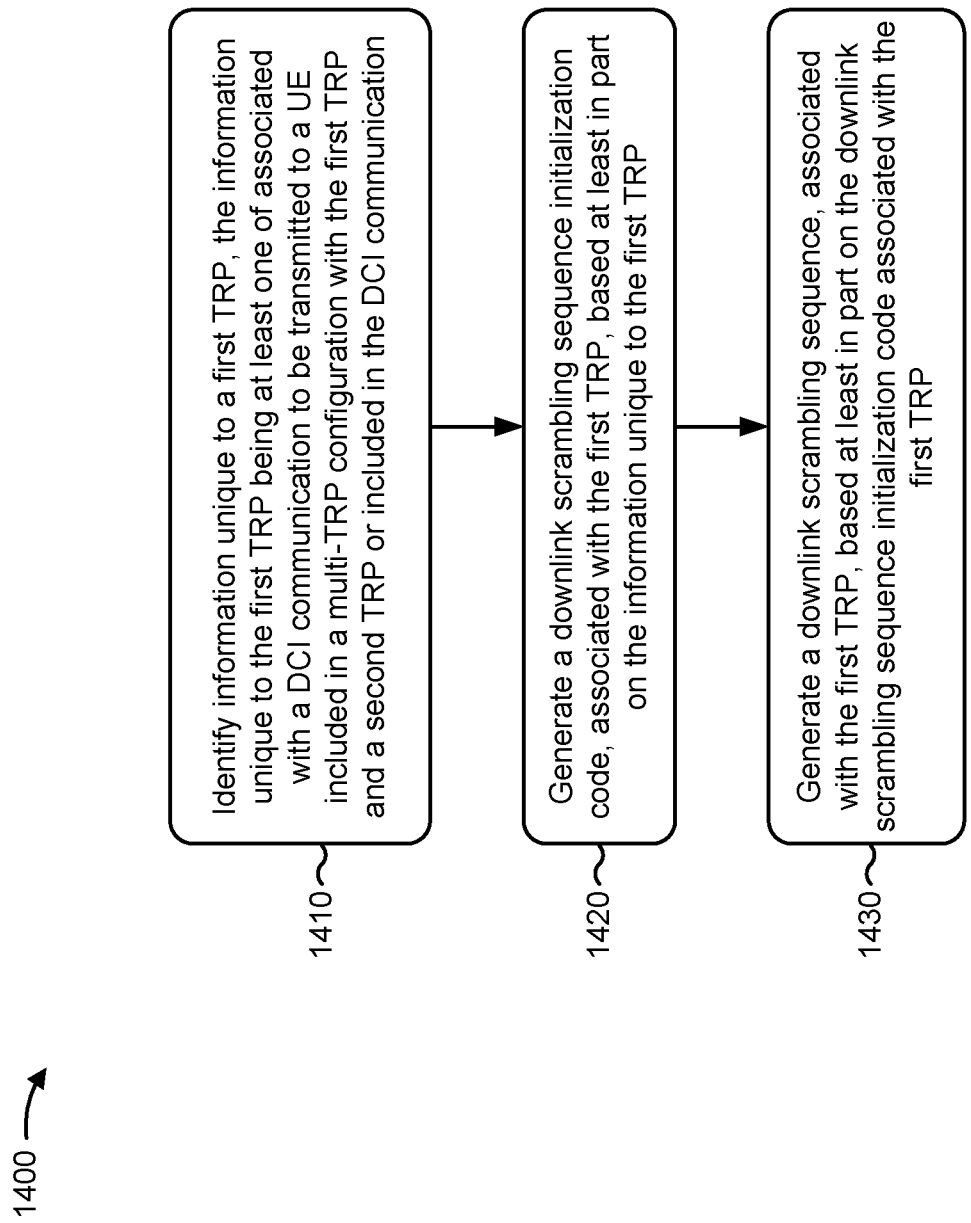

SCRAMBLING SEQUENCE GENERATION FOR A MULTI-TRANSMIT RECEIVE POINT CONFIGURATION

CROSS-REFERENCE TO RELATED APPLICATIONS

This application claims priority to U.S. Provisional Patent Application No. 62/789,327, filed on Jan. 7, 2019, entitled "SCRAMBLING SEQUENCE GENERATION FOR MULTI-TRANSMIT RECEIVE POINT," and to U.S. Provisional Patent Application No. 62/837,887, filed on Apr. 24, 2019, entitled "SCRAMBLING SEQUENCE GENERATION FOR MULTI-TRANSMIT RECEIVE POINT," which are hereby expressly incorporated by reference herein.

FIELD OF THE DISCLOSURE

Aspects of the present disclosure generally relate to wireless communication, and more specifically to techniques and apparatuses for scrambling sequence generation for multi-transmit receive points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In a wireless network, a UE may be communicatively connected to multiple transmit receive points (TRPs), referred to as a multi-TRP configuration (or more simply "a multi-TRP"), and may transmit communications to, or receive communications from, the multiple TRPs. In some cases, a TRP may scramble data that is to be included in a downlink communication for purposes of interference rejection at another TRP of the multi-TRP, for purposes of avoidance of undesired signal spectrum properties, or the like. However, a scrambling sequence used by the TRP may be used by one or more other TRPs of the multi-TRP. For example, if two of the TRPs use the same cell identifier, use overlapping frequency and time allocation, and are assigned the same codeword index, the two TRPs may generate the same downlink scrambling sequence initialization code, which in turn may be used to generate the same downlink scrambling sequence. Use of the same scrambling sequence may degrade or inhibit the UE's ability to reject interference caused by transmission of a first downlink communication by one of the two TRPs when receiving a second downlink communication that is transmitted by the other of the two TRPs. This, in turn, degrades performance on the wireless communication link between the second TRP and the UE.

SUMMARY

In some aspects, a method of wireless communication, performed by a user equipment (UE), may include receiving, from a first transmit receive point (TRP), a downlink control information (DCI) communication, wherein the UE is included in a multi-TRP configuration with the first TRP and a second TRP. The method may include identifying, in the DCI communication, information that is unique to the first TRP. The method may include generating a downlink scrambling sequence initialization code, associated with the first TRP, based at least in part on the information that is unique to the first TRP. The method may include generating a downlink scrambling sequence, associated with the first TRP, based at least in part on the downlink scrambling sequence initialization code associated with the first TRP, wherein the UE is to use the downlink scrambling sequence to descramble a downlink communication received from the first TRP.

In some aspects, a UE for wireless communication may include memory and one or more processors operatively coupled to the memory. The memory and the one or more processors may be configured to receive, from a first TRP, a DCI communication, wherein the UE is included in a multi-TRP configuration with the first TRP and a second TRP. The memory and the one or more processors may be configured to identify, in the DCI communication, information that is unique to the first TRP. The memory and the one or more processors may be configured to generate a downlink scrambling sequence initialization code, associated with the first TRP, based at least in part on the information that is unique to the first TRP. The memory and the one or more processors may be configured to generate a downlink scrambling sequence, associated with the first TRP, based at least in part on the downlink scrambling sequence initialization code associated with the first TRP, wherein the UE is to use the downlink scrambling sequence to descramble a downlink communication received from the first TRP.

In some aspects, a non-transitory computer-readable medium may store one or more instructions for wireless communication. The one or more instructions, when executed by one or more processors of a UE, may cause the one or more processors to receive, from a first TRP, a DCI communication, wherein the UE is included in a multi-TRP configuration with the first TRP and a second TRP. The one or more instructions, when executed by one or more processors of the UE, may cause the one or more processors to identify, in the DCI communication, information that is unique to the first TRP. The one or more instructions, when executed by one or more processors of the UE, may cause the one or more processors to generate a downlink scrambling sequence initialization code, associated with the first TRP, based at least in part on the information that is unique to the first TRP. The one or more instructions, when executed by one or more processors of the UE, may cause the one or more processors to generate a downlink scrambling sequence, associated with the first TRP, based at least in part on the downlink scrambling sequence initialization code associated with the first TRP, wherein the UE is to use the downlink scrambling sequence to descramble a downlink communication received from the first TRP.

In some aspects, an apparatus for wireless communication may include means for receiving, from a first TRP, a DCI communication, wherein the apparatus is included in a multi-TRP configuration with the first TRP and a second TRP. The apparatus may include means for identifying, in the DCI communication, information that is unique to the first TRP. The apparatus may include means for generating a downlink scrambling sequence initialization code, associated with the first TRP, based at least in part on the information that is unique to the first TRP. The apparatus may include means for generating a downlink scrambling sequence, associated with the first TRP, based at least in part on the downlink scrambling sequence initialization code associated with the first TRP, wherein the apparatus is to use the downlink scrambling sequence to descramble a downlink communication received from the first TRP.

In some aspects, a method of wireless communication, performed by a first TRP, may include identifying information, to be transmitted in a DCI communication to a UE, that is unique to the first TRP, wherein the first TRP is included in a multi-TRP configuration with the UE and a second TRP. The method may include generating a downlink scrambling sequence initialization code, associated with the first TRP, based at least in part on the information that is unique to the first TRP. The method may include generating a downlink scrambling sequence, associated with the first TRP, based at least in part on the downlink scrambling sequence initialization code associated with the first TRP, wherein the first TRP is to use the downlink scrambling sequence to scramble a downlink communication that is to be transmitted, by the first TRP, to the UE.

In some aspects, a first TRP for wireless communication may include memory and one or more processors operatively coupled to the memory. The memory and the one or more processors may be configured to identify information, to be transmitted in a DCI communication to a UE, that is unique to the first TRP, wherein the first TRP is included in a multi-TRP configuration with the UE and a second TRP. The memory and the one or more processors may be configured to generate a downlink scrambling sequence initialization code, associated with the first TRP, based at least in part on the information that is unique to the first TRP. The memory and the one or more processors may be configured to generate a downlink scrambling sequence, associated with the first TRP, based at least in part on the downlink scrambling sequence initialization code associated with the first TRP, wherein the first TRP is to use the downlink scrambling sequence to scramble a downlink communication that is to be transmitted, by the first TRP, to the UE.

In some aspects, a non-transitory computer-readable medium may store one or more instructions for wireless communication. The one or more instructions, when executed by one or more processors of a first TRP, may cause the one or more processors to identify information, to be transmitted in a DCI communication to a UE, that is unique to the first TRP, wherein the first TRP is included in a multi-TRP configuration with the UE and a second TRP. The one or more instructions, when executed by one or more processors of the first TRP, may cause the one or more processors to generate a downlink scrambling sequence initialization code, associated with the first TRP, based at least in part on the information that is unique to the first TRP. The one or more instructions, when executed by one or more processors of the first TRP, may cause the one or more processors to generate a downlink scrambling sequence, associated with the first TRP, based at least in part on the downlink scrambling sequence initialization code associated with the first TRP, wherein the first TRP is to use the downlink scrambling sequence to scramble a downlink communication that is to be transmitted, by the first TRP, to the UE.

In some aspects, an apparatus for wireless communication may include means for identifying information, to be transmitted in a DCI communication to a UE, that is unique to the apparatus, wherein the apparatus is included in a multi-TRP configuration with the UE and a TRP. The apparatus may include means for generating a downlink scrambling sequence initialization code, associated with the apparatus, based at least in part on the information that is unique to the apparatus. The apparatus may include means for generating a downlink scrambling sequence, associated with the apparatus, based at least in part on the downlink scrambling sequence initialization code associated with the apparatus, wherein the apparatus is to use the downlink scrambling sequence to scramble a downlink communication that is to be transmitted, by the apparatus, to the UE.

In some aspects, a method of wireless communication, performed by a UE, may include receiving, from a first TRP, a DCI communication, the UE being included in a multi-TRP configuration with the first TRP and a second TRP; determining information associated with the DCI communication, the information associated with the DCI communication being unique to the first TRP; generating a downlink scrambling sequence initialization code, associated with the first TRP, based at least in part on the information associated with the DCI; and generating a downlink scrambling sequence, associated with the first TRP, based at least in part on the downlink scrambling sequence initialization code associated with the first TRP.

In some aspects, a UE for wireless communication may include memory and one or more processors operatively coupled to the memory. The memory and the one or more processors may be configured to receive, from a first TRP, a DCI communication, the UE being included in a multi-TRP configuration with the first TRP and a second TRP; determine information associated with the DCI communication, the information associated with the DCI communication being unique to the first TRP; generate a downlink scrambling sequence initialization code, associated with the first TRP, based at least in part on the information associated with the DCI; and generate a downlink scrambling sequence, associated with the first TRP, based at least in part on the downlink scrambling sequence initialization code associated with the first TRP.

In some aspects, a non-transitory computer-readable medium may store one or more instructions for wireless communication. The one or more instructions, when executed by one or more processors of a UE, may cause the one or more processors to: receive, from a first TRP, a DCI communication, the UE being included in a multi-TRP configuration with the first TRP and a second TRP; determine information associated with the DCI communication, the information associated with the DCI communication being unique to the first TRP; generate a downlink scrambling sequence initialization code, associated with the first TRP, based at least in part on the information associated with the DCI; and generate a downlink scrambling sequence, associated with the first TRP, based at least in part on the downlink scrambling sequence initialization code associated with the first TRP.

In some aspects, an apparatus for wireless communication may include means for receiving, from a first TRP, a DCI communication, the apparatus being included in a multi-TRP configuration with the first TRP and a second TRP; means for determining information associated with the DCI communication, the information associated with the DCI communication being unique to the first TRP; means for generating a downlink scrambling sequence initialization code, associated with the first TRP, based at least in part on the information associated with the DCI; and means for generating a downlink scrambling sequence, associated with the first TRP, based at least in part on the downlink scrambling sequence initialization code associated with the first TRP.

In some aspects, a method of wireless communication, performed by a first TRP, may include identifying information associated with a DCI communication to be transmitted to a UE included in a multi-TRP configuration with the first TRP and a second TRP, the information associated with the DCI being unique to the first TRP; generating a downlink scrambling sequence initialization code, associated with the first TRP, based at least in part on the information associated with the DCI; and generating a downlink scrambling sequence, associated with the first TRP, based at least in part on the downlink scrambling sequence initialization code associated with the first TRP.

In some aspects, a TRP for wireless communication may include memory and one or more processors operatively coupled to the memory. The memory and the one or more processors may be configured to identify information associated with a DCI communication to be transmitted to a UE included in a multi-TRP configuration with the first TRP and a second TRP, the information associated with the DCI being unique to the first TRP; generate a downlink scrambling sequence initialization code, associated with the first TRP, based at least in part on the information associated with the DCI; and generate a downlink scrambling sequence, associated with the first TRP, based at least in part on the downlink scrambling sequence initialization code associated with the first TRP.

In some aspects, a non-transitory computer-readable medium may store one or more instructions for wireless communication. The one or more instructions, when executed by one or more processors of a TRP, may cause the one or more processors to: identify information associated with a DCI communication to be transmitted to a UE included in a multi-TRP configuration with the first TRP and a second TRP, the information associated with the DCI being unique to the first TRP; generate a downlink scrambling sequence initialization code, associated with the first TRP, based at least in part on the information associated with the DCI; and generate a downlink scrambling sequence, associated with the first TRP, based at least in part on the downlink scrambling sequence initialization code associated with the first TRP.

In some aspects, an apparatus for wireless communication may include means for identifying information associated with a DCI communication to be transmitted to a UE included in a multi-TRP configuration with the apparatus and a TRP, the information associated with the DCI being unique to the apparatus; means for generating a downlink scrambling sequence initialization code, associated with the apparatus, based at least in part on the information associated with the DCI; and means for generating a downlink scrambling sequence, associated with the apparatus, based at least in part on the downlink scrambling sequence initialization code associated with the apparatus.

In some aspects, a method of wireless communication, performed by a UE, may include receiving, from a first TRP, a DCI communication, the UE being included in a multi-TRP configuration with the first TRP and a second TRP; identifying information unique to the first TRP, the information unique to the first TRP being at least one of associated with the DCI communication or included in the DCI communication; generating a downlink scrambling sequence initialization code, associated with the first TRP, based at least in part on the information unique to the first TRP; and generating a downlink scrambling sequence, associated with the first TRP, based at least in part on the downlink scrambling sequence initialization code associated with the first TRP.

In some aspects, a UE for wireless communication may include memory and one or more processors operatively coupled to the memory. The memory and the one or more processors may be configured to receive, from a first TRP, a DCI communication, the UE being included in a multi-TRP configuration with the first TRP and a second TRP; identify information unique to the first TRP, the information unique to the first TRP being at least one of associated with the DCI communication or included in the DCI communication; generate a downlink scrambling sequence initialization code, associated with the first TRP, based at least in part on the information unique to the first TRP; and generate a downlink scrambling sequence, associated with the first TRP, based at least in part on the downlink scrambling sequence initialization code associated with the first TRP.

In some aspects, a non-transitory computer-readable medium may store one or more instructions for wireless communication. The one or more instructions, when executed by one or more processors of a UE, may cause the one or more processors to receive, from a first TRP, a DCI communication, the UE being included in a multi-TRP configuration with the first TRP and a second TRP; identify information unique to the first TRP, the information unique to the first TRP being at least one of associated with the DCI communication or included in the DCI communication; generate a downlink scrambling sequence initialization code, associated with the first TRP, based at least in part on the information unique to the first TRP; and generate a downlink scrambling sequence, associated with the first TRP, based at least in part on the downlink scrambling sequence initialization code associated with the first TRP.

In some aspects, an apparatus for wireless communication may include means for receiving, from a first TRP, a DCI communication, the apparatus being included in a multi- TRP configuration with the first TRP and a second TRP; means for identifying information unique to the first TRP, the information unique to the first TRP being at least one of associated with the DCI communication or included in the DCI communication; means for generating a downlink scrambling sequence initialization code, associated with the first TRP, based at least in part on the information unique to the first TRP; and means for generating a downlink scrambling sequence, associated with the first TRP, based at least in part on the downlink scrambling sequence initialization code associated with the first TRP.

In some aspects, a method of wireless communication, performed by a first TRP, may include identifying information unique to the first TRP, the information unique to the first TRP being at least one of associated with a DCI communication to be transmitted to a UE included in a multi-TRP configuration with the first TRP and a second TRP or included in the DCI communication; generating a downlink scrambling sequence initialization code, associated with the first TRP, based at least in part on the information unique to the first TRP; and generating a downlink scrambling sequence, associated with the first TRP, based at least in part on the downlink scrambling sequence initialization code associated with the first TRP.

In some aspects, a TRP for wireless communication may include memory and one or more processors operatively coupled to the memory. The memory and the one or more processors may be configured to identify information unique to the first TRP, the information unique to the first TRP being at least one of associated with a DCI communication to be transmitted to a UE included in a multi-TRP configuration with the first TRP and a second TRP or included in the DCI communication; generate a downlink scrambling sequence initialization code, associated with the first TRP, based at least in part on the information unique to the first TRP; and generate a downlink scrambling sequence, associated with the first TRP, based at least in part on the downlink scrambling sequence initialization code associated with the first TRP.

In some aspects, a non-transitory computer-readable medium may store one or more instructions for wireless communication. The one or more instructions, when executed by one or more processors of a TRP, may cause the one or more processors to identify information unique to the first TRP, the information unique to the first TRP being at least one of associated with a DCI communication to be transmitted to a UE included in a multi-TRP configuration with the first TRP and a second TRP or included in the DCI communication; generate a downlink scrambling sequence initialization code, associated with the first TRP, based at least in part on the information unique to the first TRP; and generate a downlink scrambling sequence, associated with the first TRP, based at least in part on the downlink scrambling sequence initialization code associated with the first TRP.

In some aspects, an apparatus for wireless communication may include means for identifying information unique to the first TRP, the information unique to the first TRP being at least one of associated with a DCI communication to be transmitted to a UE included in a multi-TRP configuration with the first TRP and a second TRP or included in the DCI communication; means for generating a downlink scrambling sequence initialization code, associated with the apparatus, based at least in part on the information unique to the first TRP; and means for generating a downlink scrambling sequence, associated with the apparatus, based at least in part on the downlink scrambling sequence initialization code associated with the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 7A-7E are diagrams illustrating an example of scrambling sequence generation for multi-TRP, in accordance with various aspects of the present disclosure.

FIG. 12 is a diagram illustrating an example process performed, for example, by a TRP, in accordance with various aspects of the present disclosure.

FIG. 13 is a diagram illustrating an example process performed, for example, by a user equipment, in accordance with various aspects of the present disclosure.

FIG. 14 is a diagram illustrating an example process performed, for example, by a TRP, in accordance with various aspects of the present disclosure.

DETAILED DESCRIPTION

Figure 1:
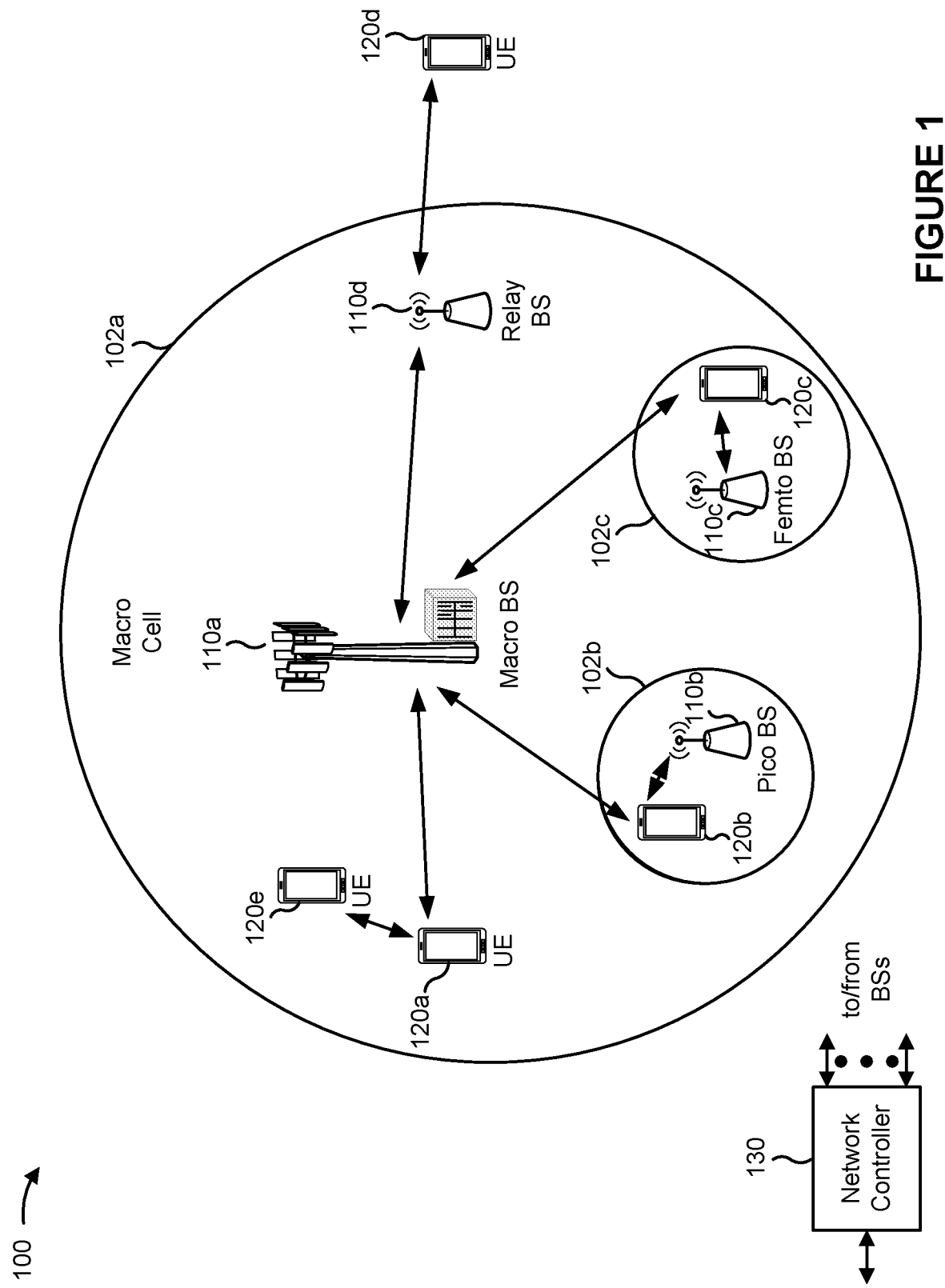
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

In a wireless network, a UE may be communicatively connected to multiple TRPs, referred to as a multi-TRP configuration (or more simply "a multi-TRP"), and may transmit communications to, or receive communications from, the multiple TRPs. A TRP of the multi-TRP configuration may transmit a downlink communication to the UE on one or more downlink channels of a wireless communication link between the TRP and the UE.

In some cases, the TRP may scramble data that is to be included in the downlink communication for purposes of interference rejection at another TRP of the multi-TRP configuration, for purposes of avoidance of undesired signal spectrum properties, or the like. Scrambling is a process in which the data is multiplied or added with a downlink scrambling sequence to randomize the data. The downlink scrambling sequence may include a pseudorandom sequence that is generated using a downlink scrambling sequence initialization code in a pseudorandom sequence generator (for example, a linear feedback shift register or another type of pseudorandom sequence generator). The downlink scrambling sequence initialization code may include a 32-bit (or another quantity of bits) integer that may be generated based at least in part on Equation 1:

$$c_{init}=(n_{RNTI}*x)+(q*y)+n_{ID} \qquad \text{Equation 1}$$

where $c_{init}$ corresponds to the downlink scrambling sequence initialization code, $n_{RNTI}$ corresponds to the Radio Network Temporary Identifier (RNTI) associated with the downlink communication (for example, which may include 16 bits of the 32-bit integer), q corresponds to the codeword index (for example, 1 bit, of the 32-bit integer that includes a 0 value or a 1 value), $n_{ID}$ corresponds to the cell identifier associated with the TRP (for example, 10 bits of the 32-bit integer), and x and y are constants.

In some cases, the scrambling sequence that is used by more than one TRP of the multi-TRP configuration may be the same scrambling sequence. For example, if two of the TRPs use the same cell identifier, use overlapping frequency and time allocation, and are assigned the same codeword index, each TRP of the two TRPs may generate the same downlink scrambling sequence initialization code, which, in turn, may be used to generate the same downlink scrambling sequence. This may degrade or inhibit the UE's ability to reject interference that is caused by transmission of a first downlink communication by a first TRP of the two TRPs when receiving a second downlink communication that is transmitted by a second TRP of the two TRPs. This, in turn, degrades the performance on the wireless communication link between the second TRP and the UE.

Some aspects described herein provide techniques and apparatuses for scrambling sequence generation for a multi-TRP configuration. In some aspects, a TRP may transmit a downlink control information (DCI) communication to the UE. In some aspects, the DCI communication may include information that is unique to the TRP. In such a case, the UE and the TRP may each generate a downlink scrambling sequence initialization code, associated with the TRP, based at least in part on the information included in the DCI that is unique to the TRP. Additionally or alternatively, the UE and the TRP may generate the downlink scrambling sequence initialization code based at least in part on information associated with the DCI communication, the information associated with the DCI being unique to the TRP. In other words, the UE and the TRP may generate the downlink scrambling sequence initialization code based at least in part on information that is unique to the TRP, but that is not explicitly included in the DCI communication.

After generating the downlink scrambling sequence initialization code (in either manner) the UE and TRP may each generate a downlink scrambling sequence, associated with the TRP, based at least in part on the downlink scrambling sequence initialization code associated with the TRP. Accordingly, the TRP may scramble a downlink communication that is to be transmitted to the UE using the downlink scrambling sequence, and the UE may receive and descramble the downlink communication using the downlink scrambling sequence. In this way, the downlink scrambling sequence generated by the UE and the TRP is generated in a way that results in the downlink scrambling sequence being unique to the TRP. This enables the UE to perform interference rejection for downlink communications received from another TRP in a multi-TRP configuration, which in turn increases the performance of the wireless communication link between the UE and the other TRP.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 110a-110d, and may provide coordination and control for these BSs. Network controller 130 may communicate with the BSs via a backhaul. The BSs may also communicate with one another, for example, directly or indirectly via a wireless or wireline backhaul.

In some aspects, a cell might not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a-120e) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
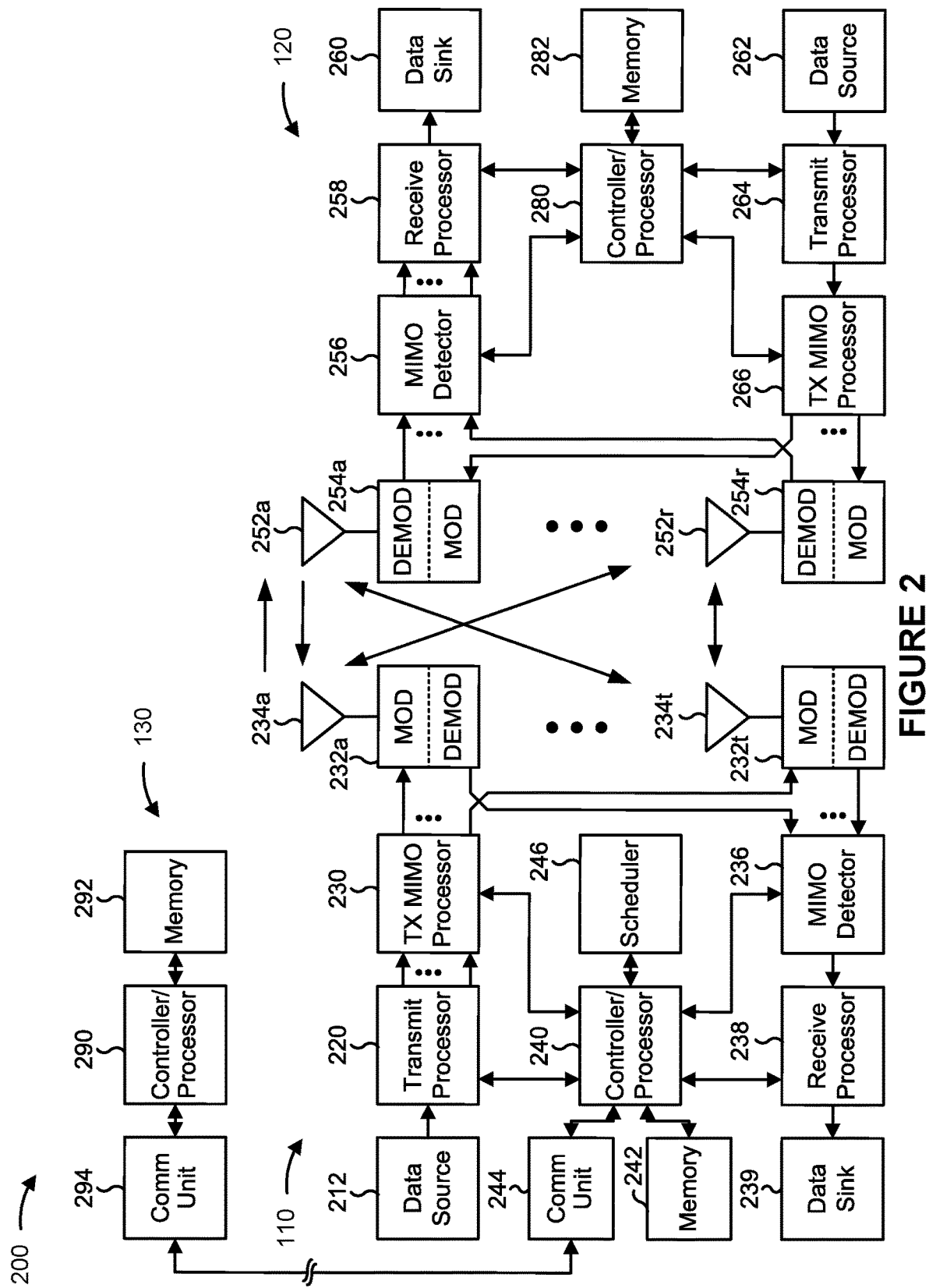
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with scrambling sequence generation for a multi-TRP configuration, as described in more detail elsewhere herein. For example, controller/processor 240 of base station 110, controller/processor 280 of UE 120, or any other component(s) of FIG. 2 may perform or direct operations of, for example, process 800 of FIG. 8, process 900 of FIG. 9, process 1100 of FIG. 11, process 1200 of FIG. 12, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving, from a first transmit receive point (TRP), a downlink control information (DCI) communication, wherein UE 120 is included in a multi-TRP configuration with the first TRP and a second TRP, means for identifying, in the DCI communication, information that is unique to the first TRP, means for generating a downlink scrambling sequence initialization code, associated with the first TRP, based at least in part on the information that is unique to the first TRP, means for generating a downlink scrambling sequence, associated with the first TRP, based at least in part on the downlink scrambling sequence initialization code associated with the first TRP, wherein UE 120 is to use the downlink scrambling sequence to descramble a downlink communication received from the first TRP, or the like. In some aspects, UE 120 may include means for receiving, from a first TRP, a DCI communication, the UE 120 being included in a multi-TRP configuration with the first TRP and a second TRP, means for determining information associated with the DCI communication, the information associated with the DCI communication being unique to the first TRP, means for generating a downlink scrambling sequence initialization code, associated with the first TRP, based at least in part on the information associated with the DCI, means for generating a downlink scrambling sequence, associated with the first TRP, based at least in part on the downlink scrambling sequence initialization code associated with the first TRP, or the like. In some aspects, UE 120 may include means for receiving, from a first TRP, a DCI communication, the UE 120 being included in a multi-TRP configuration with the first TRP and a second TRP, means for determining information unique to the first TRP, the information unique to the first TRP being at least one of associated with the DCI communication or included in the DCI communication, means for generating a downlink scrambling sequence initialization code, associated with the first TRP, based at least in part on the information unique to the first TRP, means for generating a downlink scrambling sequence, associated with the first TRP, based at least in part on the downlink scrambling sequence initialization code associated with the first TRP, or the like. In some aspects, such means may include one or more components of UE 120 described in connection with FIG. 2.

In some aspects, a first TRP (for example, BS 110) may include means for identifying information, to be transmitted in a DCI communication to a UE, that is unique to the first TRP, wherein the first TRP is included in a multi-TRP configuration with the UE and a second TRP, means for generating a downlink scrambling sequence initialization code, associated with the first TRP, based at least in part on the information that is unique to the first TRP, means for generating a downlink scrambling sequence, associated with the first TRP, based at least in part on the downlink scrambling sequence initialization code associated with the first TRP, wherein the first TRP is to use the downlink scrambling sequence to scramble a downlink communication that is to be transmitted, by the first TRP, to the UE, or the like. In some aspects, a first TRP may include means for identifying information associated with a DCI communication to be transmitted to a UE 120 included in a multi-TRP configuration with the first TRP and a second TRP, the information associated with the DCI being unique to the first TRP, means for generating a downlink scrambling sequence initialization code, associated with the first TRP, based at least in part on the information associated with the DCI, means for generating a downlink scrambling sequence, associated with the first TRP, based at least in part on the downlink scrambling sequence initialization code associated with the first TRP, or the like. In some aspects, a first TRP may include means for identifying information unique to the first TRP, the information unique to the first TRP being at least one of associated with a DCI communication to be transmitted to a UE 120 included in a multi-TRP configuration with the first TRP and a second TRP or included in the DCI communication, means for generating a downlink scrambling sequence initialization code, associated with the first TRP, based at least in part on the information unique to the first TRP, means for generating a downlink scrambling sequence, associated with the first TRP, based at least in part on the downlink scrambling sequence initialization code associated with the first TRP, or the like. In some aspects, such means may include one or more components of base station 110 described in connection with FIG. 2.

Figure 3A:
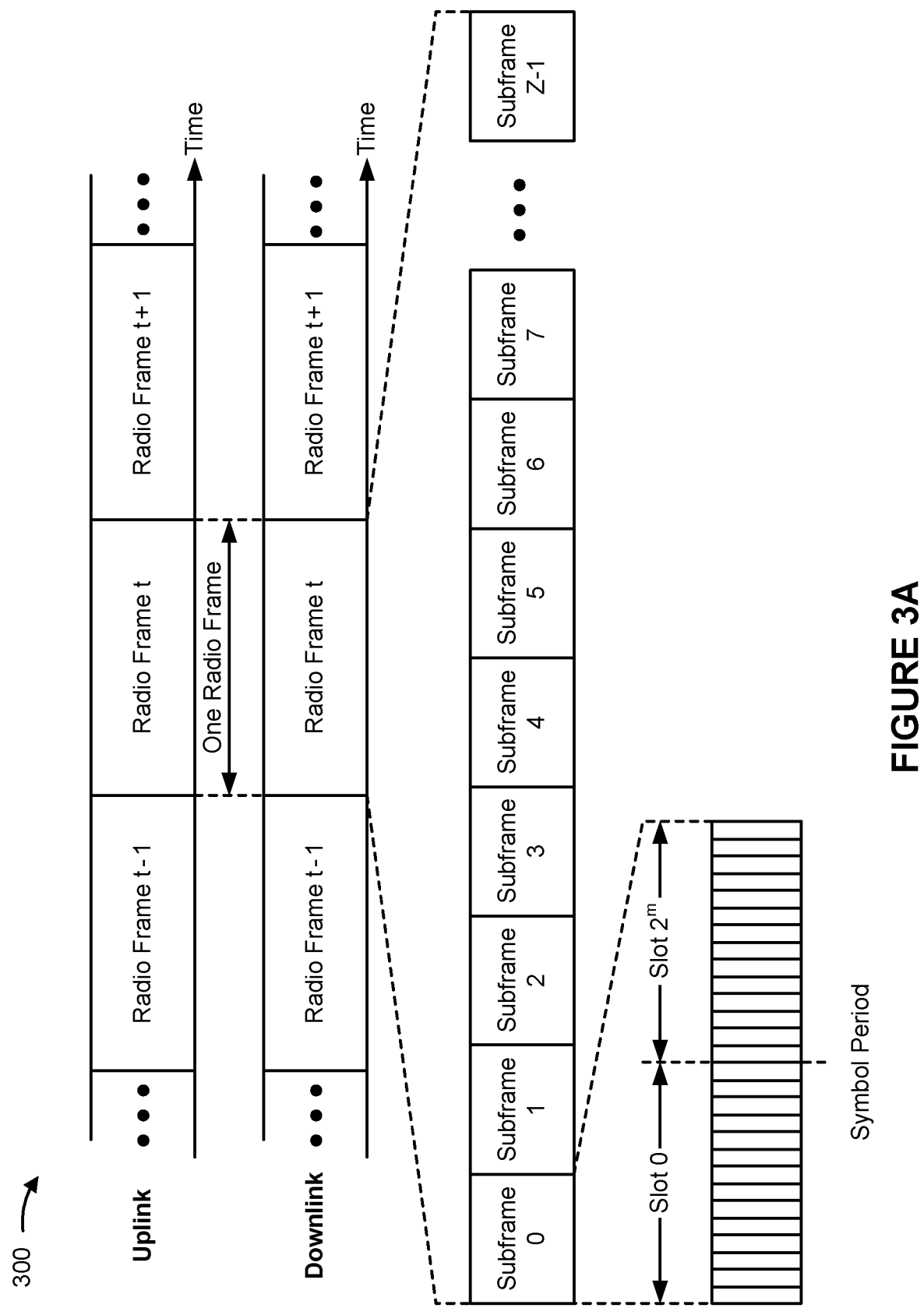
FIG. 3A is a block diagram illustrating an example frame structure for use in a wireless network in accordance with various aspects of the present disclosure.

FIG. 3A is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, or the like, or combinations thereof). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, or the like, or combinations thereof.

While some techniques are described herein in connection with frames, subframes, slots, or the like, or combinations thereof, these techniques may equally apply to other types of wireless communication structures, which may be referred to using terms other than "frame," "subframe," "slot," or the like, or combinations thereof in 5G NR. In some aspects, a wireless communication structure may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), a secondary synchronization signal (SSS), or the like, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
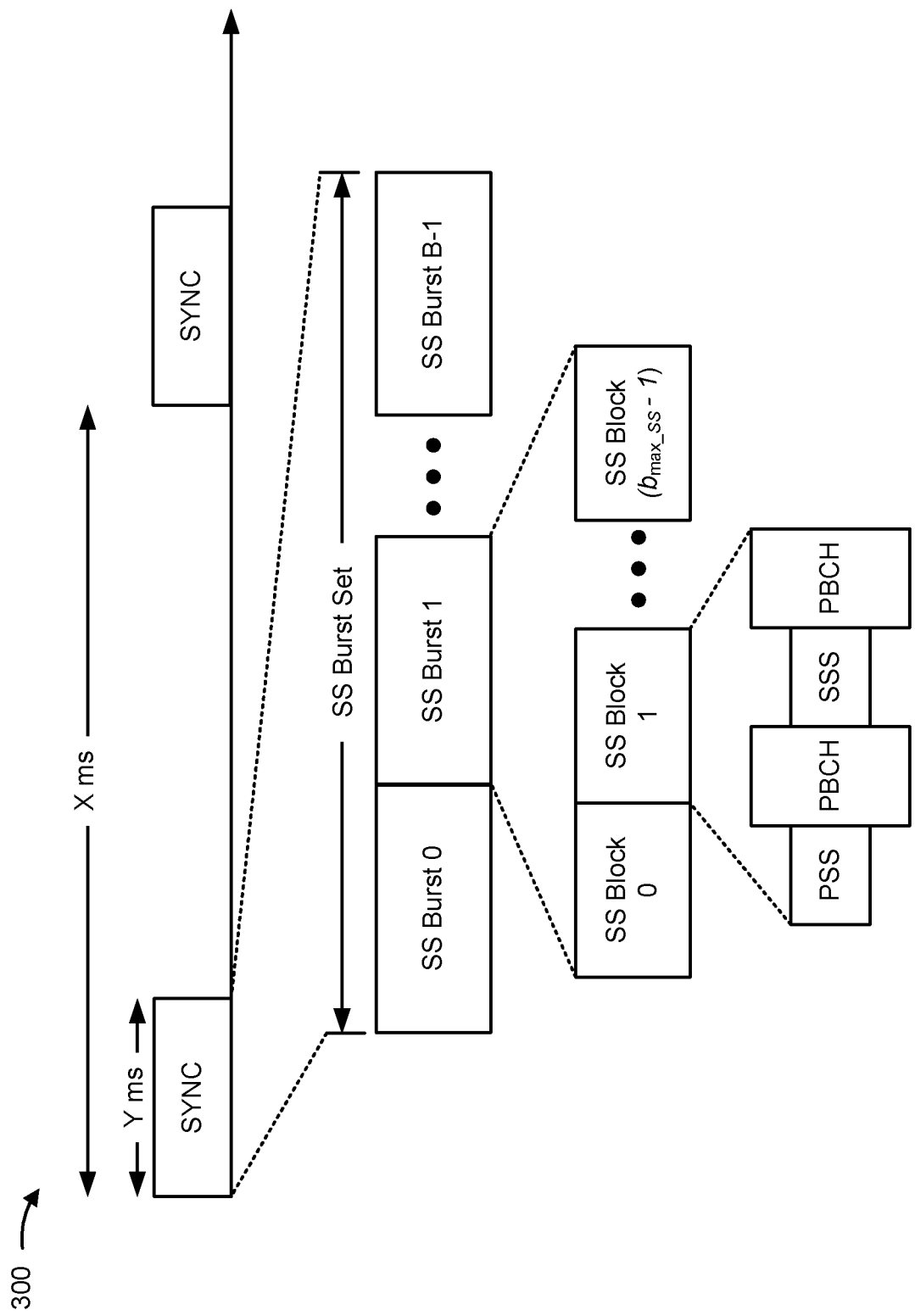
FIG. 3B is a block diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum quantity of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum quantity of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station in accordance with the burst period. In other words, the SS blocks may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBS) on a physical downlink shared channel (PDSCH) in some slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

Figure 4:
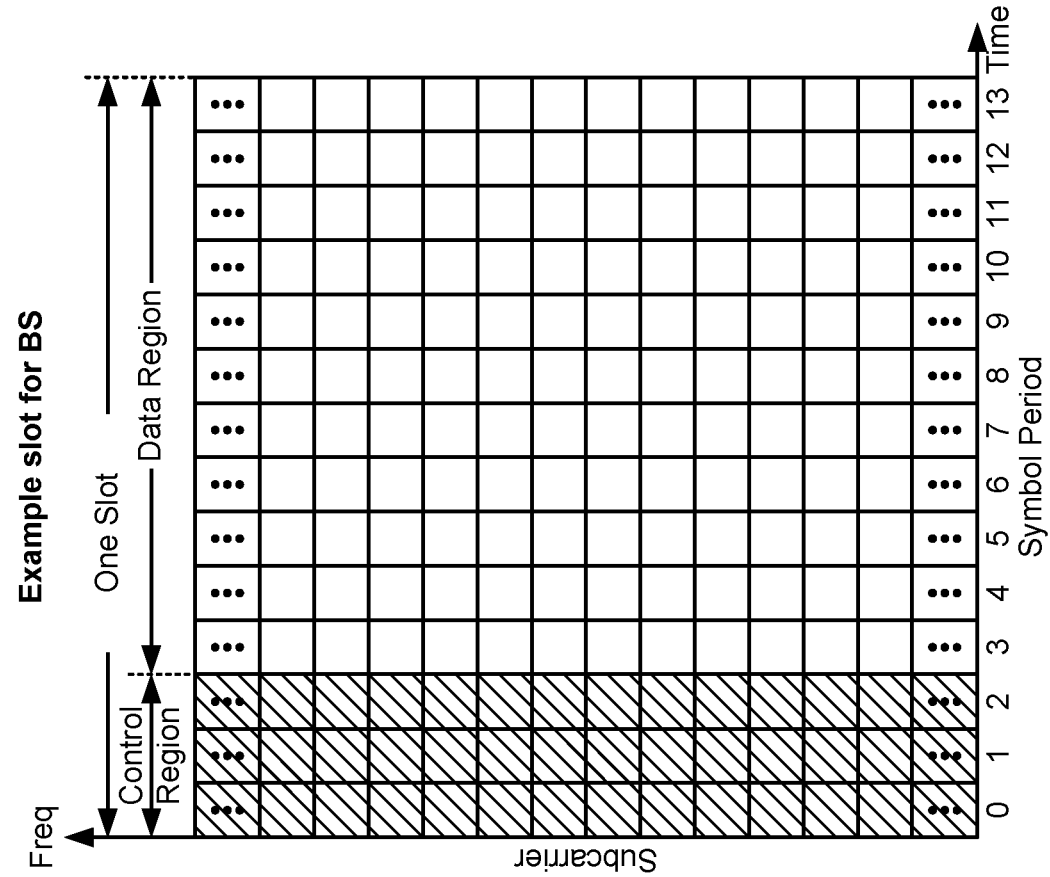
FIG. 4 is a block diagram illustrating an example slot format in accordance with various aspects of the present disclosure.

FIG. 4 is a block diagram 400 illustrating an example slot format 410 in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q−Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, or the like, or combinations thereof. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such as central units or distributed units.

Figure 5:
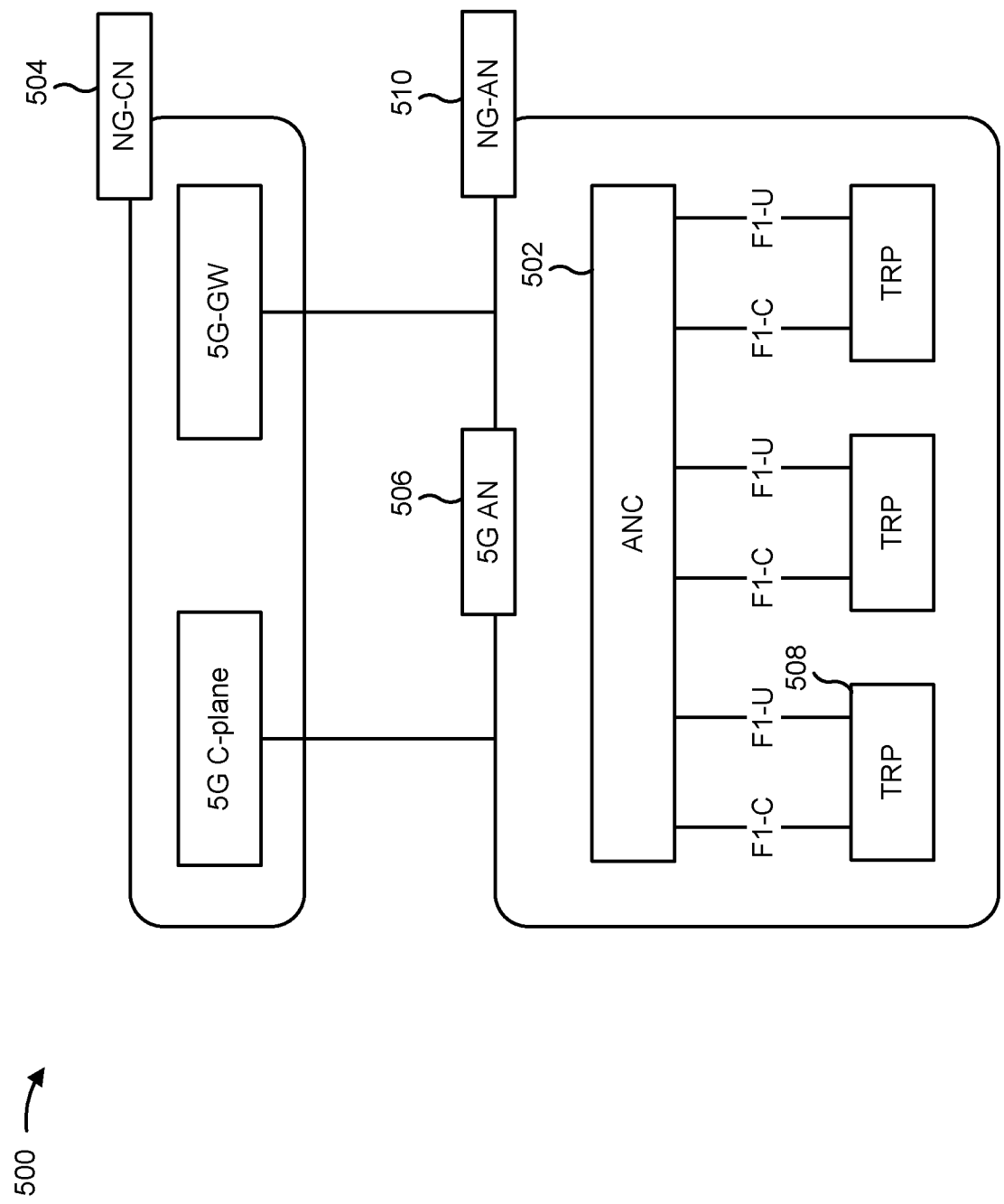
FIG. 5 illustrates an example logical architecture of a distributed radio access network (RAN) in accordance with various aspects of the present disclosure.

FIG. 5 illustrates an example logical architecture of a distributed radio access network (RAN) 500 in accordance with various aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) 510 may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (for example, dynamic selection) or jointly (for example, joint transmission) serve traffic to a UE.

The local architecture of RAN 500 may be used to support fronthaul definition. The architecture may be defined to support fronthauling solutions across different deployment types. For example, the architecture may be based at least in part on transmit network capabilities (for example, bandwidth, latency, or jitter).

The architecture may share features or components with LTE. In some aspects, NG-AN 510 may support dual connectivity with NR. NG-AN 510 may share a common fronthaul for LTE and NR.

The architecture may enable cooperation between and among TRPs 508. For example, cooperation may be preset within a TRP or across TRPs via the ANC 502. In some aspects, no inter-TRP interface may be needed/present.

In some aspects, a dynamic configuration of split logical functions may be present within the architecture of RAN 500. The packet data convergence protocol (PDCP), radio link control (RLC), and MAC protocol layers may be adaptably placed at the ANC or TRP.

Figure 6:
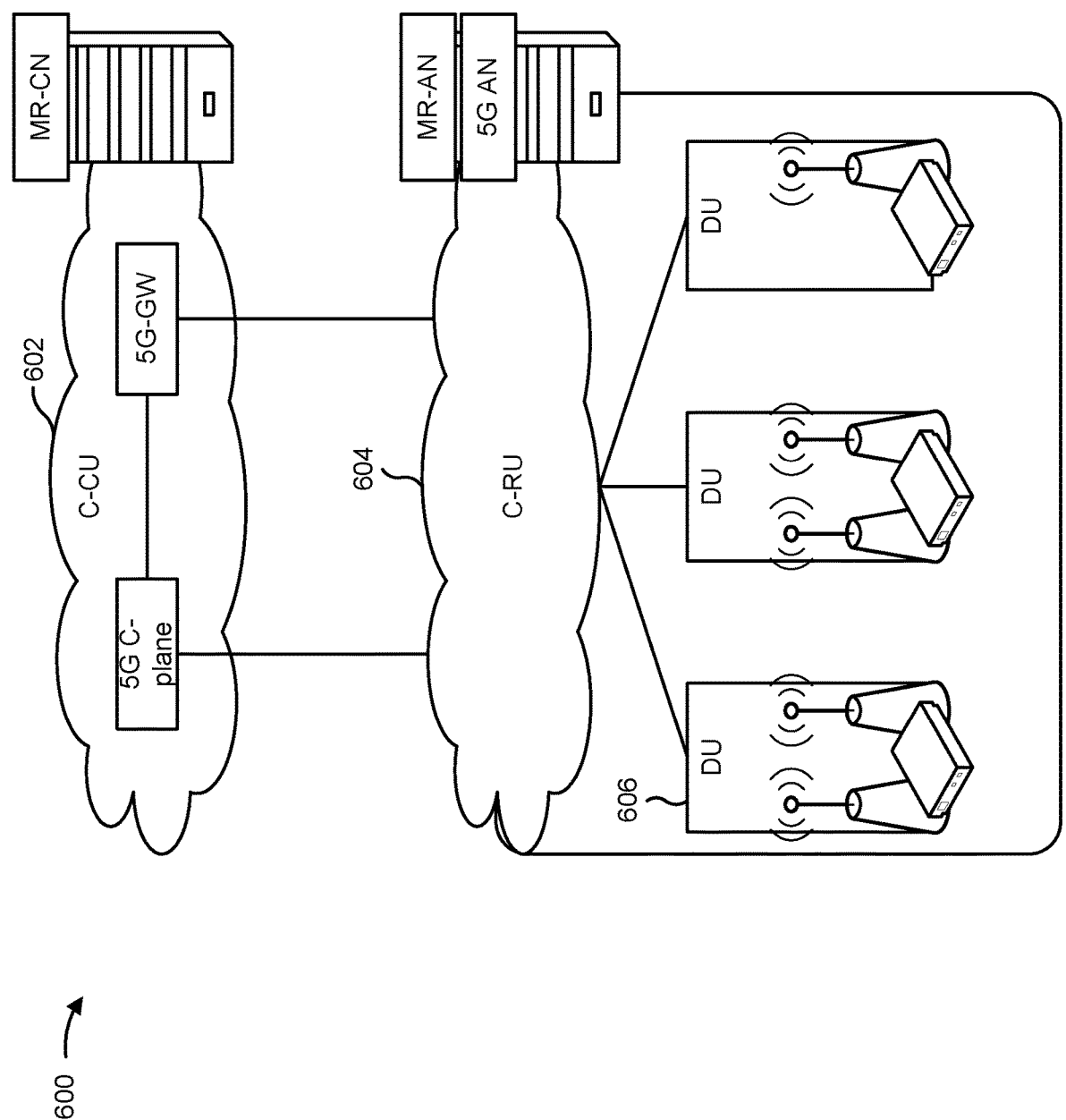
FIG. 6 illustrates an example physical architecture of a distributed RAN in accordance with various aspects of the present disclosure.

FIG. 6 illustrates an example physical architecture of a distributed RAN 600 in accordance with various aspects of the present disclosure. A centralized core network unit (C-CU) 602 may host core network functions. The C-CU may be centrally deployed. C-CU functionality may be offloaded (for example, to advanced wireless services (AWS)), in an effort to handle peak capacity. A centralized RAN unit (C-RU) 604 may host one or more ANC functions. Optionally, the C-RU may host core network functions locally. The C-RU may have distributed deployment. The C-RU may be closer to the network edge. A distributed unit (DU) 606 may host one or more TRPs. The DU may be located at edges of the network with radio frequency (RF) functionality.

In a wireless network, a UE may be communicatively connected to a plurality of TRPs, referred to as a multi-TRP configuration, and may transmit communications to, or receive communications from, the plurality of TRPs. A TRP, of the plurality of TRPs, may transmit a downlink communication, to the UE, on one or more downlink channels of a wireless communication link between the TRP and the UE.

In some cases, the TRP may scramble data, that is to be included in the downlink communication, for purposes of interference rejection at another TRP of the plurality of TRPs, for purposes of avoidance of undesired signal spectrum properties, or the like. Scrambling is a process in which the data is multiplied or added with a downlink scrambling sequence to randomize the data. The downlink scrambling sequence may include a pseudorandom sequence that is generated using a downlink scrambling sequence initialization code in a pseudorandom sequence generator (for example, a linear feedback shift register or another type of pseudorandom sequence generator). The downlink scrambling sequence initialization code may include a 32-bit (or another quantity of bits) integer that may be generated based at least in part on Equation 1 described above.

In some cases, the scrambling sequence that is used by more than one TRP of the plurality of TRPs may be the same scrambling sequence. For example, if two TRPs of the multi-TRP configuration use the same cell identifier, use overlapping frequency and time allocation, and are assigned the same codeword index, each TRP of the two TRPs may generate the same downlink scrambling sequence initialization code, and, in turn, may generate the same downlink scrambling sequence. This may degrade or inhibit the UE's ability to reject interference that is caused by transmission of a first downlink communication by first TRP of the two TRPs when receiving a second downlink communication that is transmitted by a second TRP of the two TRPs. This, in turn, degrades the performance on the wireless communication link between the second TRP and the UE.

Some aspects described herein provide techniques and apparatuses for scrambling sequence generation for a multi-TRP configuration. In some aspects, a TRP may transmit a DCI communication to the UE. In some aspects, the DCI communication may include information that is unique to the TRP. In such a case, the UE and the TRP may each generate a downlink scrambling sequence initialization code, associated with the TRP, based at least in part on the information included in the DCI that is unique to the TRP. Additionally or alternatively, the UE and the TRP may generate the downlink scrambling sequence initialization code based at least in part on information associated with the DCI communication, the information associated with the DCI being unique to the TRP. In other words, the UE and the TRP may generate the downlink scrambling sequence initialization code based at least in part on information that is unique to the TRP, but that is not explicitly included in the DCI communication.

After generating the downlink scrambling sequence initialization code (in either manner) the UE and TRP may each generate a downlink scrambling sequence, associated with the TRP, based at least in part on the downlink scrambling sequence initialization code associated with the TRP. Accordingly, the TRP may scramble a downlink communication that is to be transmitted to the UE using the downlink scrambling sequence, and the UE may receive and descramble the downlink communication using the downlink scrambling sequence. In this way, the downlink scrambling sequence generated by the UE and the TRP is generated in a way that results in the downlink scrambling sequence being unique to the TRP. This enables the UE to perform interference rejection for downlink communications received from another TRP in a multi-TRP configuration, which in turn increases the performance of the wireless communication link between the UE and the other TRP.

FIGS. 7A-7E are diagrams illustrating an example 700 of scrambling sequence generation for a multi-TRP configuration in accordance with various aspects of the present disclosure. As shown in FIGS. 7A-7E, example 700 may include a plurality of transmit receive points (TRPs) (for example, TRP1 and TRP2, although more than two TRPs may be included) and a user equipment (UE) (for example, UE 120). In some aspects, each TRP, of the plurality of TRPs illustrated in FIGS. 7A-7E, may correspond to a respective base station (for example, TRP1 may correspond to BS 110*a* and TRP2 may correspond to BS 110*b*). In some other aspects, two or more TRPs of the plurality of TRPs may correspond to the same base station.

The plurality of TRPs, and UE 120, may be included in a wireless network. In some aspects, UE 120 may be communicatively connected with the plurality of TRPs in a multi-TRP configuration (for example, UE 120 may be communicatively connected with TRP1 and TRP2). A TRP, of the plurality of TRPs, may transmit one or more downlink communications to UE 120 on one or more downlink channels of a wireless communication link between the TRP and UE 120. In some aspects, to transmit a downlink communication to UE 120, the TRP may scramble the downlink communication (for example, by scrambling the data that is included in the downlink communication), prior to transmitting the downlink communication to UE 120, using a downlink scrambling sequence. UE 120 may receive the downlink scrambling sequence and may descramble the downlink communication (for example, by descrambling the data that is included in the downlink communication) using the downlink scrambling sequence.

As shown in FIG. 7A, in a first operation 702, to ensure that each TRP included in the multi-TRP configuration is associated with a unique scrambling sequence, a TRP may transmit, to UE 120, a respective downlink control information (DCI) communication (or another type of signaling communication, such as a medium access control (MAC) control element (MAC-CE) communication, a radio resource control (RRC) communication, or the like) that includes information that is unique to the TRP. For example, TRP1 may transmit a first DCI communication that includes information that is unique to TRP1, and TRP2 may transmit a second DCI communication that includes information that is unique to TRP2. In some aspects, the first DCI communication and the second DCI communication may be transmitted, to UE 120, via respective physical downlink control channels (PDCCHs). For example, TRP1 may transmit the first DCI communication via a first PDCCH, and TRP2 may transmit the second DCI communication via a second PDCCH.

In some aspects, the information that is unique to a particular TRP may include a value, an identifier, or the like, that is typically only assigned to one TRP in a multi-TRP configuration. The information included in a DCI communication that is unique to the particular TRP may be associated with various types of fields, or combinations of fields, included in the DCI communication. For example, the information that is unique to TRP1 may include a demodulation reference signal sequence (DMRS) sequence initialization code associated with TRP1 that is identified in a DMRS sequence initialization field included in the DCI communication. As another example, the information that is unique to TRP1 may include a transmission configuration indication (TCI) value associated with TRP1 that is identified in a TCI field included in the DCI communication. As another example, the information that is unique to TRP1 may include a hybrid automatic repeat request (HARQ) process identifier, associated with TRP1 and selected from a set of HARQ process identifiers assigned to the first TRP, that is identified in a HARQ process identifier field included in the DCI communication. As another example, the information that is unique to TRP1 may include a HARQ process identifier set identifier (for example, an identifier that identifies an exclusive set of HARQ process identifiers that is assigned to TRP1), associated with TRP1, identified in a HARQ process identifier set identifier field included in the DCI communication.

Figure 7B:
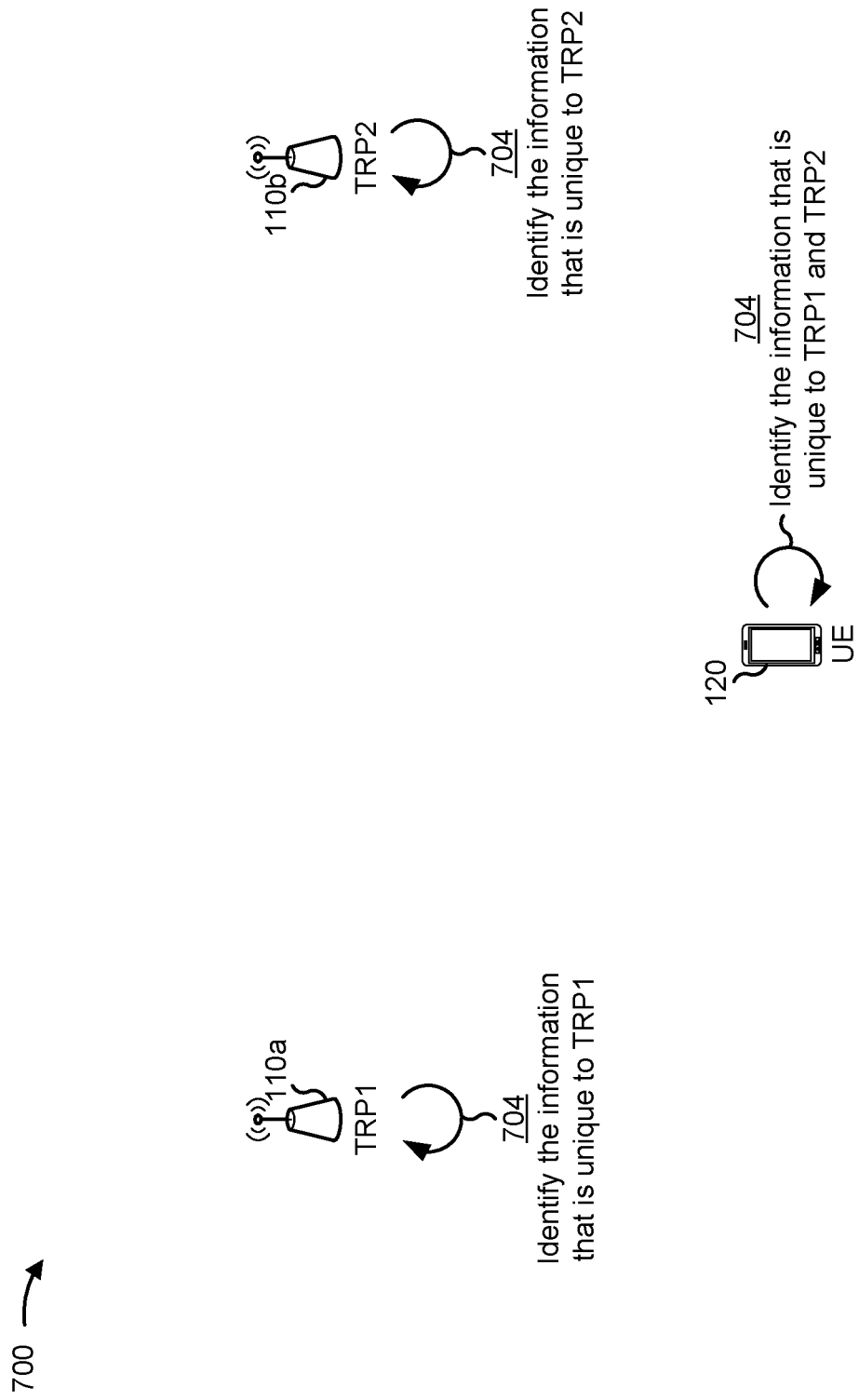

As shown in FIG. 7B, in a second operation 704, TRP1 and UE 120 may each identify the information that is unique to TRP1, and TRP2 and UE 120 may each identify the information that is unique to TRP2. TRP1 may identify the information that is unique to TRP1 based at least in part on being configured to identify the information that is unique to TRP1 (for example, by being configured to identify the HARQ process identifier associated with TRP1, by being configured to identify the HARQ process identifier and the TCI value associated with TRP1, or the like). Similarly, TRP2 may identify the information that is unique to TRP2 based at least in part on being configured to identify the information that is unique to TRP2.

In some aspects, UE 120 may be configured to identify the information that is unique to TRP1 in the first DCI communication received from TRP1, may receive from TRP1 an instruction to identify, in the first DCI communication, the information that is unique to TRP1, or the like. For example, UE 120 may receive from TRP1 an instruction to identify the DMRS sequence initialization code associated with TRP1 included in the DMRS sequence initialization code of the first DCI communication. Similarly, UE 120 may be configured to identify the information that is unique to TRP2 in the second DCI communication received from TRP2, may receive from TRP2 an instruction to identify, in the second DCI communication, the information that is unique to TRP2, or the like.

Figure 7C:
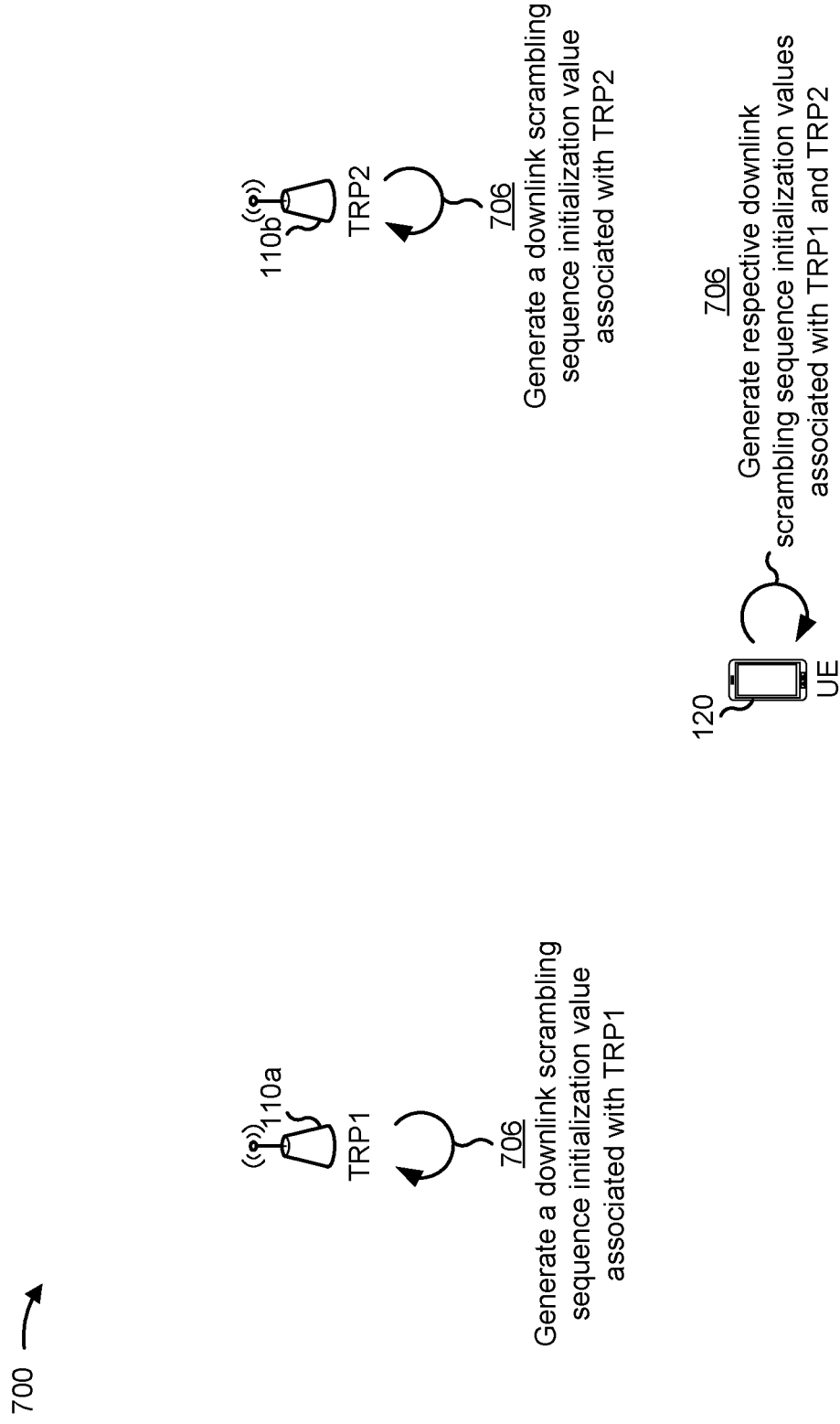

As shown in FIG. 7C, in a third operation 706, TRP1 and UE 120 may each generate a downlink scrambling sequence initialization code associated with TRP1, and TRP2 and UE 120 may each generate a downlink scrambling sequence initialization code associated with TRP2. For example, TRP1 and UE 120 may each generate the downlink scrambling sequence initialization code associated with TRP1 based at least in part on the information that is unique to TRP1; and TRP2 and UE 120 may each generate the downlink scrambling sequence initialization code associated with TRP2 based at least in part on the information that is unique to TRP2. In this way, the downlink scrambling sequence initialization code associated with TRP1 and the downlink scrambling sequence initialization associated with TRP2 are different downlink scrambling sequence initialization codes, which ensures that the respective downlink scrambling sequences that are generated for TRP1 and TRP2 are different downlink scrambling sequences.

In some aspects, to generate a downlink scrambling sequence initialization code for TRP1, TRP1 and UE 120 may incorporate the information that is unique to TRP1 into Equation 1 above using one or more of the unused bits in the 32 available bits of the downlink scrambling sequence initialization code for TRP1. For example, TRP1 and UE 120 may select respective values for the unused bits based at least in part on the information that is unique to TRP1. Similarly, TRP2 and UE 120 may incorporate the information that is unique to TRP2 into Equation 1 above using one or more of the unused bits in the 32 available bits of the downlink scrambling sequence initialization code for TRP2. For example, TRP2 and UE 120 may select respective values for the unused bits based at least in part on the information that is unique to TRP2. Accordingly, TRP1, TRP2, and UE 120 may each generate a downlink scrambling sequence initialization code according to Equation 2:

$$c_{init} = (n_{RNTI} * x) + (q * y) + (UI_{TRP} * z) + n_{ID} \qquad \text{Equation 2}$$

where $c_{init}$ corresponds to the downlink scrambling sequence initialization code for a particular TRP, $n_{RNTI}$ corresponds to the RNTI associated with a downlink communication to be transmitted by the particular TRP, q corresponds to the codeword index assigned to the TRP, $n_{ID}$ corresponds to the cell identifier associated with the particular TRP, $UI_{TRP}$ corresponds to the unique information associated with the particular TRP, and x, y, and z are constants.

Because $n_{RNTI}$ occupies 16 bits of the 32 available bits, q occupies 1 bit of the 32 available bits, and $n_{ID}$ occupies 10 bits of the available 32 bits, there may be up to 5 unused bits that may be used for the information that is unique to the particular TRP. Thus, the HARQ process identifier associated with the particular TRP (which may occupy 4 bits) may be included in the unused bits, the HARQ process identifier set identifier associated with the particular TRP (which may occupy 1 bit) may be included in the unused bits, the TCI value associated with the particular TRP (which may occupy 3 bits) may be included in the unused bits, the DMRS sequence initialization value (which may occupy 1 bit) may be included in the unused bits, or a combination thereof may be included in the unused bits. While the preceding examples illustrate possible fields and combinations of fields that may be included in the unused bits, other fields and combinations of fields are contemplated. For example, if all TRPs in the multi-TRP operation use only one codeword, there is no need to send the codeword index q explicity. In this case, the parameter q can be repurposed so that the q index indicates a TRP index.

Figure 7D:
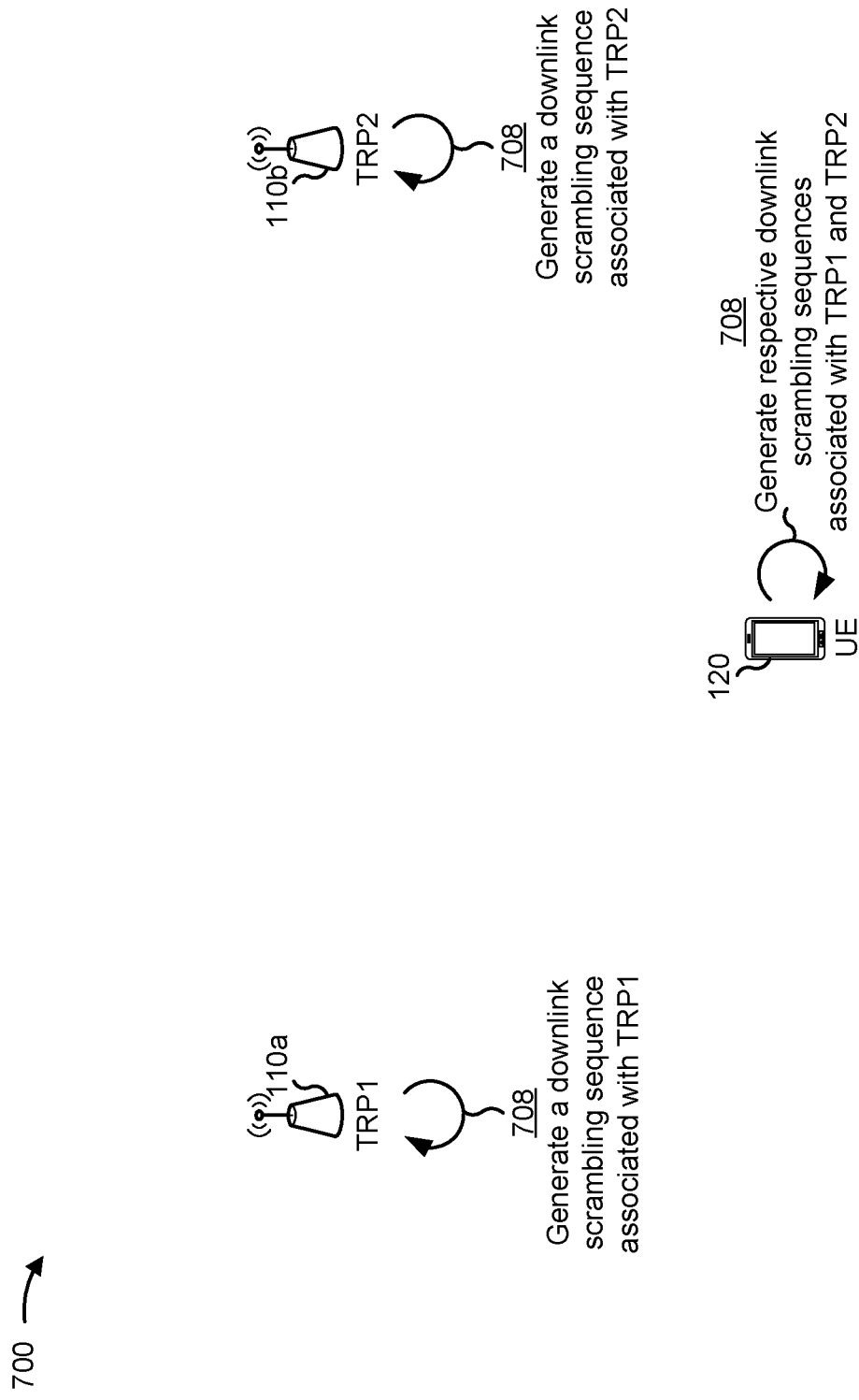

As shown in FIG. 7D, in a fourth operation 708, TRP1 and UE 120 may each generate a downlink scrambling sequence associated with TRP1, and TRP2 and UE 120 may each generate a downlink scrambling sequence associated with TRP2. For example, TRP1 and UE 120 may each generate the downlink scrambling sequence associated with TRP1 based at least in part on the downlink scrambling sequence initiation code associated with TRP1; and TRP2 and UE 120 may each generate the downlink scrambling sequence initialization code associated with TRP2 based at least in part on the downlink scrambling sequence initiation code associated with TRP2.

To generate a downlink scrambling sequence for TRP1, TRP1 and UE 120 may each use the downlink scrambling sequence initiation code associated with TRP1 as an initializer in a downlink scrambling sequence generator, such as a linear feedback shift register, another type of additive or multiplicative shift register, or another type of pseudorandom sequence generator. Similarly, to generate a downlink scrambling sequence for TRP2, TRP2 and UE 120 may each use the downlink scrambling sequence initiation code associated with TRP2 as an initializer in a downlink scrambling sequence generator, such as a linear feedback shift register or another type of additive or multiplicative shift register. In this way, the downlink scrambling sequence initialization code associated with TRP1, and the downlink scrambling sequence initialization associated with TRP2, are different downlink scrambling sequence initialization codes.

Figure 7E:
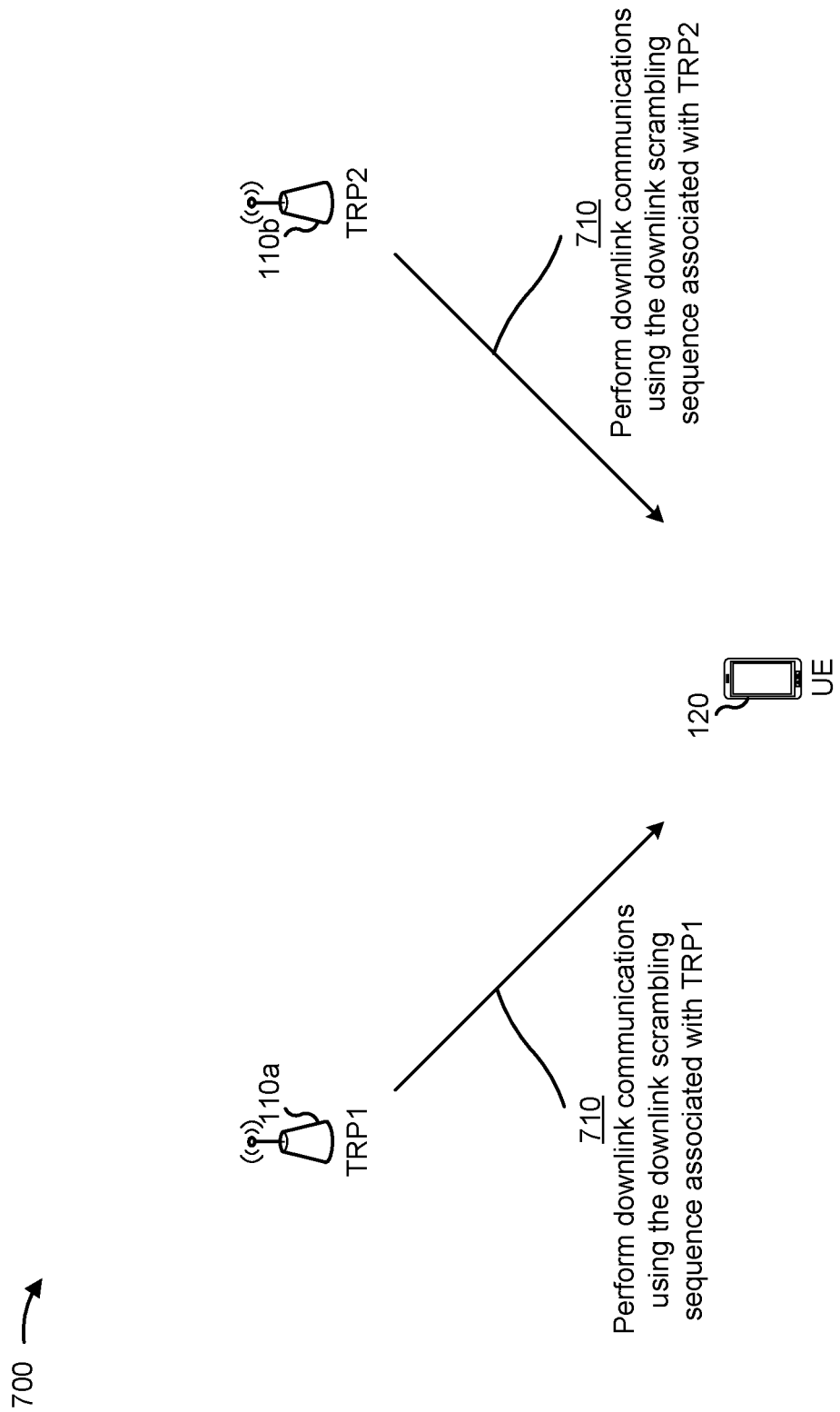

As shown in FIG. 7E, in a fifth operation 710, TRP1, TRP2, and UE 120 may participate in downlink communications using the generated downlink scrambling sequences. For example, TRP1 may scramble a downlink communication (for example, by scrambling the data that is to be included in the downlink communication) using the downlink scrambling sequence associated with TRP1 (for example, that was generated by TRP1 based at least in part on the unique information associated with TRP1) and may transmit, to UE 120, the downlink communication via a downlink channel (for example, a physical downlink shared channel (PDSCH) on the downlink between TRP1 and UE 120). UE 120 may receive the downlink communication and may descramble the downlink communication (for example, by descrambling the data that is included in the downlink communication) using the downlink scrambling sequence associated with TRP1 (for example, that was generated by UE 120 based at least in part on the unique information associated with TRP1).

As another example, TRP2 may scramble a downlink communication (for example, by scrambling the data that is to be included in the downlink communication) using the downlink scrambling sequence associated with TRP2 (for example, that was generated by TRP2 based at least in part on the unique information associated with TRP2) and may transmit, to UE 120, the downlink communication via a downlink channel (for example, a physical downlink shared channel (PDSCH) on the downlink between TRP2 and UE 120). UE 120 may receive the downlink communication and may descramble the downlink communication (for example, by descrambling the data that is included in the downlink communication) using the downlink scrambling sequence associated with TRP2 (for example, that was generated by UE 120 based at least in part on the unique information associated with TRP2).

In this way, the downlink scrambling sequence associated with TRP1 is generated in a way that results in it being unique to TRP1, and the downlink scrambling sequence associated with TRP2 is generated in a way that results in it being unique to TRP2. In this way, if UE 120 is listening for a downlink communication from TRP2, UE 120 may identify interference being caused by TRP1 (for example, due to the unique downlink scrambling sequence associated with TRP1) and may perform interference rejection for the interference being caused by TRP1, which may result in increased performance on the wireless communication link between the UE and TRP2. Similarly, if UE 120 is listening for a downlink communication from TRP1, UE 120 may identify interference being caused by TRP2 (for example, due to the unique downlink scrambling sequence associated with TRP2) and may perform interference rejection for the interference being caused by TRP2, which may result in increased performance of the wireless communication link between the UE and TRP1.

Figure 8:
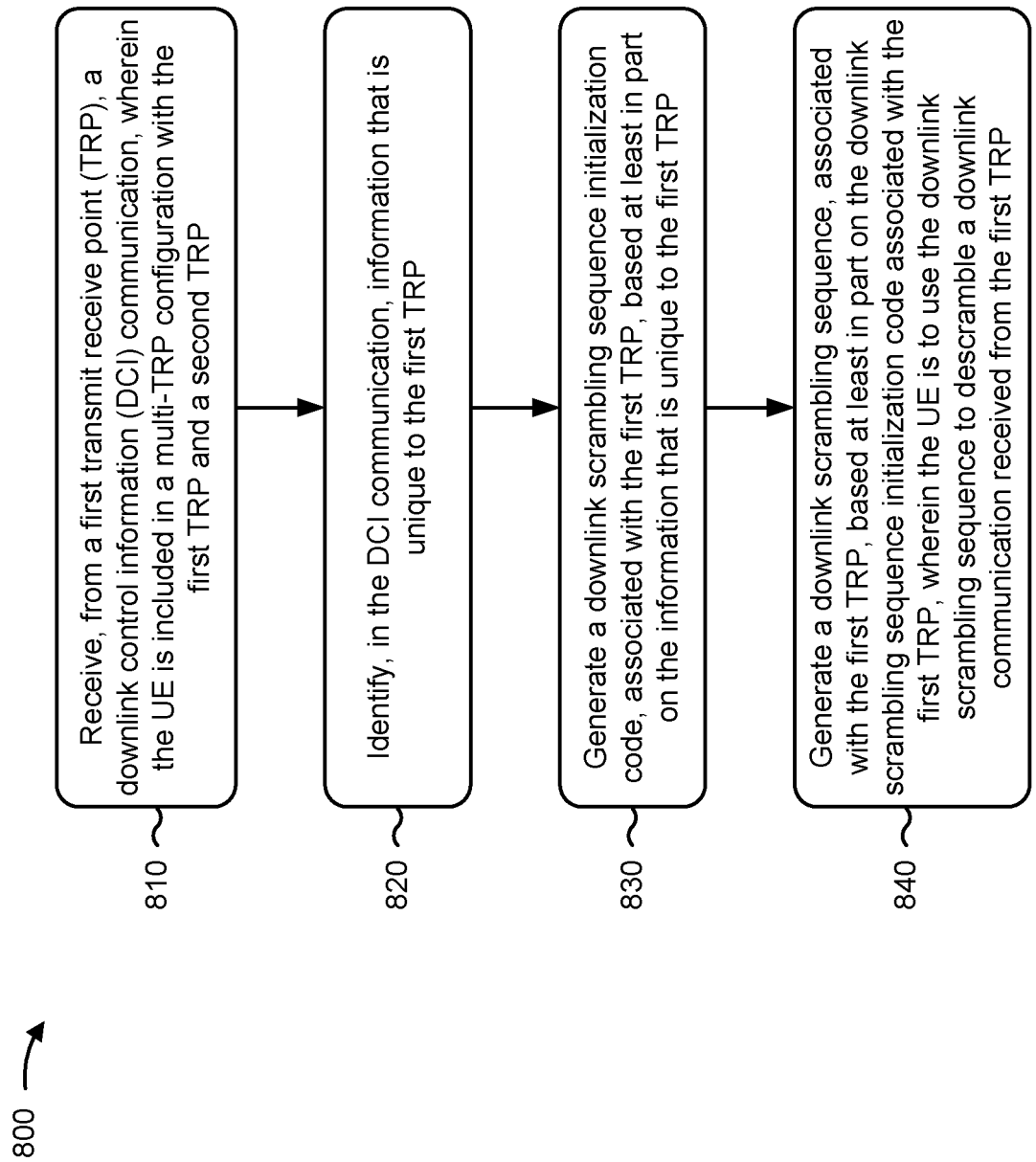
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example in which a UE (for example, UE 120) performs scrambling sequence generation for a multi-TRP configuration.

As shown in FIG. 8, in some aspects, process 800 may include receiving, from a first transmit receive point (TRP), a downlink control information (DCI) communication (block 810). For example, the UE (for example, using receive processor 258, controller/processor 280, memory 282, or the like) may receive, from a first TRP, a DCI communication as described above. In some aspects, the UE is included in a multi-TRP configuration with the first TRP and a second TRP.

As further shown in FIG. 8, in some aspects, process 800 may include identifying, in the DCI communication, information that is unique to the first TRP (block 820). For example, the UE (for example, using receive processor 258, controller/processor 280, memory 282, or the like) may identify, in the DCI communication, information that is unique to the first TRP as described above.

As further shown in FIG. 8, in some aspects, process 800 may include generating a downlink scrambling sequence initialization code associated with the first TRP, based at least in part on the information that is unique to the first TRP (block 830). For example, the UE (for example, using controller/processor 280, memory 282, or the like) may generate a downlink scrambling sequence initialization code associated with the first TRP based at least in part on the information that is unique to the first TRP as described above.

As further shown in FIG. 8, in some aspects, process 800 may include generating a downlink scrambling sequence associated with the first TRP based at least in part on the downlink scrambling sequence initialization code associated with the first TRP (block 840). For example, the UE (for example, using controller/processor 280, memory 282, or the like) may generate a downlink scrambling sequence, associated with the first TRP, based at least in part on the downlink scrambling sequence initialization code associated with the first TRP, as described above. In some aspects, the UE is to use the downlink scrambling sequence to descramble a downlink communication received from the first TRP.

Process 800 may include additional aspects, such as any single aspect or any combination of aspects described below or in connection with one or more other processes described elsewhere herein.

In a first aspect, the information that is unique to the first TRP includes at least one of a demodulation reference signal (DMRS) sequence initialization code associated with the first TRP that is different from a DMRS sequence initialization code associated with the second TRP, a transmission configuration indication (TCI) value associated with the first TRP that is different from a TCI value associated with the second TRP, a hybrid automatic repeat request (HARQ) process identifier associated with the first TRP that is different from a HARQ process identifier associated with the second TRP, or a HARQ process identifier set identifier associated with the first TRP that is different from a HARQ process identifier set identifier associated with the second TRP.

In a second aspect, alone or in combination with the first aspect, the information that is unique to the first TRP, includes a HARQ process identifier associated with the first TRP that is different from a HARQ process identifier associated with the second TRP, wherein the HARQ process identifier associated with the first TRP is included in a HARQ process identifier set associated with a HARQ process identifier set identifier assigned to the first TRP, and wherein the HARQ process identifier associated with the second TRP is included in a HARQ process identifier set associated with a HARQ process identifier set identifier assigned to the second TRP.

In a third aspect, alone or in combination with any one or more of the first and second aspects, the downlink scrambling sequence initialization code associated with the first TRP includes a plurality of bits that is to be used in a pseudorandom sequence generator to generate the downlink scrambling sequence. When generating the downlink scrambling sequence initialization code associated with the first TRP, the UE is configured to select respective values of one or more bits included in the plurality of bits based at least in part on the information that is unique to the first TRP.

Figure 9:
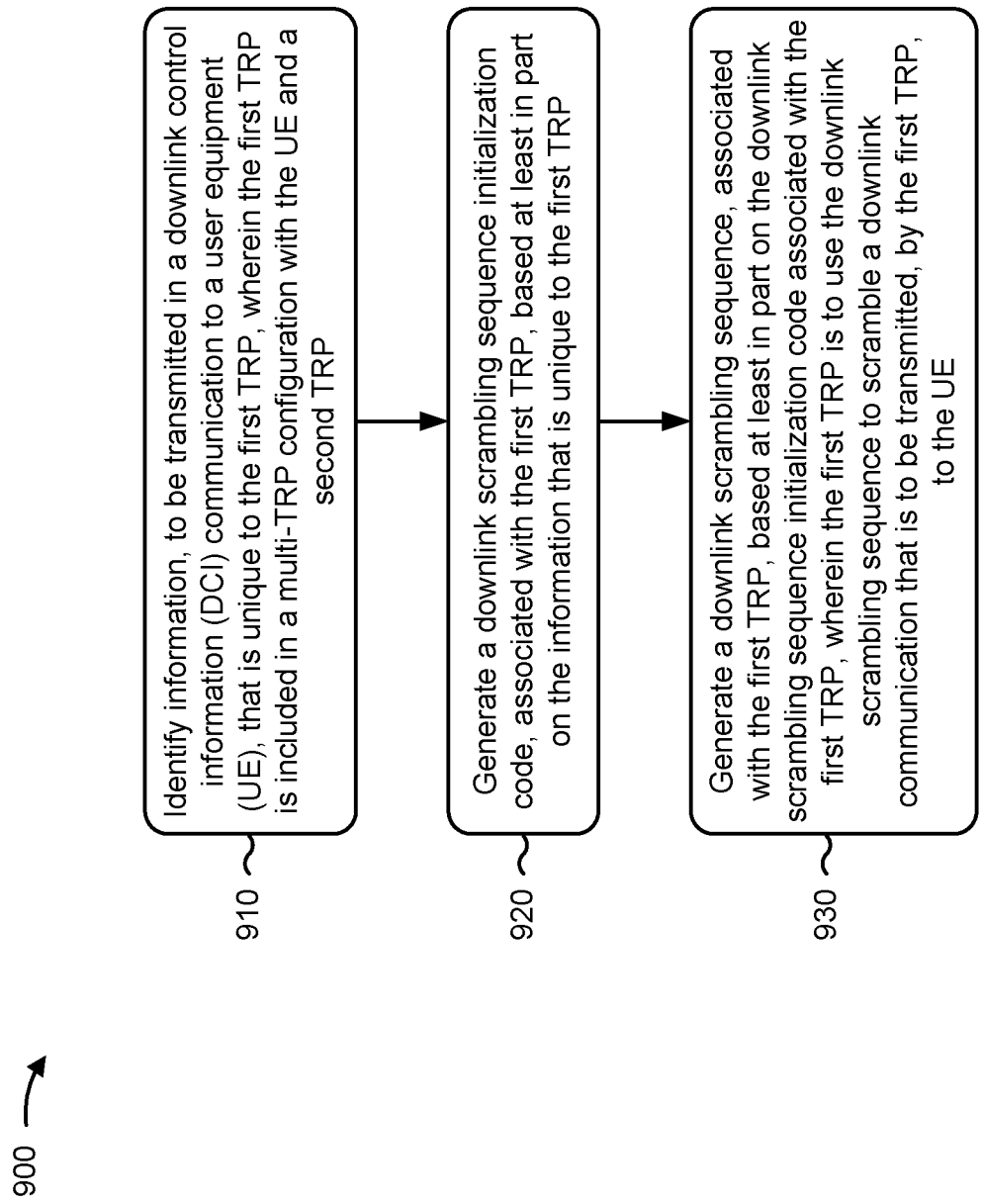
FIG. 9 is a diagram illustrating an example process performed, for example, by a TRP, in accordance with various aspects of the present disclosure.

FIG. 9 is a diagram illustrating an example process 900 performed, for example, by a first TRP, in accordance with various aspects of the present disclosure. Example process 900 is an example in which a first TRP (for example, TRP1) performs scrambling sequence generation for a multi-TRP configuration.

As shown in FIG. 9, in some aspects, process 900 may include identifying information, to be transmitted in a DCI communication to a UE, that is unique to the first TRP (block 910). For example, the first TRP (for example, using transmit processor 220, controller/processor 240, memory 242, or the like) may identify information, to be transmitted in a DCI communication to a UE, that is unique to the first TRP as described above. In some aspects, the first TRP is included in a multi-TRP configuration with the UE and a second TRP.

As shown in FIG. 9, in some aspects, process 900 may include generating a downlink scrambling sequence initialization code associated with the first TRP, based at least in part on the information that is unique to the first TRP (block 920). For example, the first TRP (for example, using controller/processor 240, memory 242, or the like) may generate a downlink scrambling sequence initialization code associated with the first TRP based at least in part on the information that is unique to the first TRP as described above.

As shown in FIG. 9, in some aspects, process 900 may include generating a downlink scrambling sequence associated with the first TRP based at least in part on the downlink scrambling sequence initialization code associated with the first TRP (block 930). For example, the first TRP (for example, using controller/processor 240, memory 242, or the like) may generate a downlink scrambling sequence associated with the first TRP based at least in part on the downlink scrambling sequence initialization code associated with the first TRP as described above. In some aspects, the first TRP is to use the downlink scrambling sequence to scramble a downlink communication that is to be transmitted by the first TRP to the UE.

Process 900 may include additional aspects, such as any single aspect or any combination of aspects described below or in connection with one or more other processes described elsewhere herein.

In a first aspect, the information that is unique to the first TRP includes at least one of a DMRS sequence initialization code associated with the first TRP that is different from a DMRS sequence initialization code associated with the second TRP, a TCI value associated with the first TRP that is different from a TCI value associated with the second TRP, a HARQ process identifier associated with the first TRP that is different from a HARQ process identifier associated with the second TRP, or a HARQ process identifier set identifier associated with the first TRP that is different from a HARQ process identifier set identifier associated with the second TRP.

In a second aspect, alone or in combination with the first aspect, the information that is unique to the first TRP includes a HARQ process identifier associated with the first TRP that is different from a HARQ process identifier associated with the second TRP, wherein the HARQ process identifier associated with the first TRP is included in a HARQ process identifier set associated with a HARQ process identifier set identifier assigned to the first TRP, and wherein the HARQ process identifier associated with the second TRP is included in a HARQ process identifier set associated with a HARQ process identifier set identifier assigned to the second TRP.

In a third aspect, alone or in combination with any one or more of the first and second aspects, the downlink scrambling sequence initialization code associated with the first TRP includes a plurality of bits that is to be used in a pseudorandom sequence generator to generate the downlink scrambling sequence. When generating the downlink scrambling sequence initialization code associated with the first TRP, the first TRP is configured to select respective values of one or more bits included in the plurality of bits based at least in part on the information that is unique to the first TRP.

FIGS. 10A-10E are diagrams illustrating an example 1000 of scrambling sequence generation for a multi-TRP configuration in accordance with various aspects of the present disclosure. As shown in FIGS. 10A-10E, example 1000 may include a plurality of TRPs (for example, TRP1 and TRP2, although more than two TRPs may be included) and a UE (for example, UE 120). In some aspects, each TRP, of the plurality of TRPs illustrated in FIGS. 10A-10E, may correspond to a respective base station (for example, TRP1 may correspond to BS 110*a*, TRP2 may correspond to BS 110b). In some other aspects, two or more TRPs of the plurality of TRPs may correspond to the same base station.

The plurality of TRPs, and UE 120, may be included in a wireless network. In some aspects, UE 120 may be communicatively connected with the plurality of TRPs in a multi-TRP configuration (for example, UE 120 may be communicatively connected with TRP1 and TRP2). A TRP, of the plurality of TRPs, may transmit one or more downlink communications to UE 120 on one or more downlink channels of a wireless communication link between the TRP and UE 120. In some aspects, to transmit a downlink communication to UE 120, the TRP may scramble the downlink communication (for example, by scrambling the data that is included in the downlink communication), prior to transmitting the downlink communication to UE 120, using a downlink scrambling sequence. UE 120 may receive the downlink scrambling sequence and may descramble the downlink communication (for example, by descrambling the data that is included in the downlink communication) using the downlink scrambling sequence.

Figure 10A:
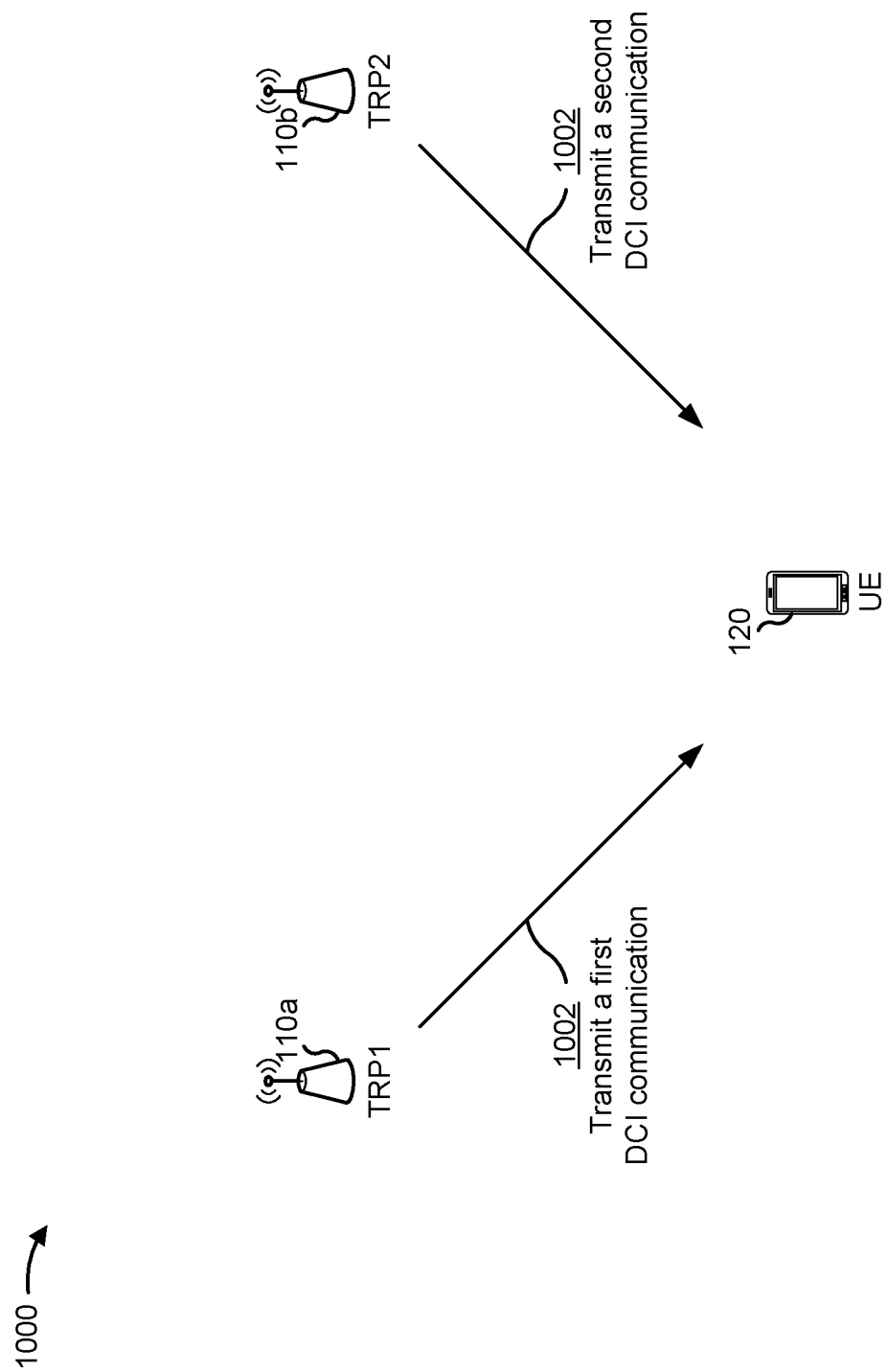
FIGS. 10A-10E are diagrams illustrating another example of scrambling sequence generation for a multi-TRP, in accordance with various aspects of the present disclosure.

As shown in FIG. 10A, in a first operation 1002, to ensure that each TRP included in the multi-TRP configuration is associated with a unique scrambling sequence, a TRP may transmit, to UE 120, a respective DCI communication (or another type of signaling communication, such as a MAC-CE communication, a RRC communication, or the like), where information associated with each DCI communication is unique to an associated TRP. For example, as described in further detail below, information associated with a given DCI communication may be unique to an associated TRP and, therefore, may be used as a basis for generating a downlink scrambling sequence initialization value.

As shown in FIG. 10A, TRP1 may transmit a first DCI communication and TRP2 may transmit a second DCI communication. In some aspects, the first DCI communication and the second DCI communication may be transmitted, to UE 120, via respective physical downlink control channels (PDCCHs). For example, TRP1 may transmit the first DCI communication in a control resource set (CORESET) associated with a first PDCCH, and TRP2 may transmit the second DCI communication in a CORESET associated with a second PDCCH.

A CORESET may be associated with information that identifies the CORESET (in other words, a CORESET identifier, such as a value of 0, 1, 2, 3, and so on). In some aspects, a CORESET may be included in a CORESET group or pool, and a CORESET group or pool may be associated with information that identifies the CORESET group or pool (in other words, CORESET group identifier or a CORESET pool index, such as a value of 0 or 1). In some aspects, a CORESET or a CORESET group may be configured on UE 120 (for example, via RRC signaling) to cause UE 120 to monitor resources of the CORESET or the CORESET group in association with receiving a DCI communication. In some aspects, UE 120 may monitor one or more configured CORESETS and received DCI communications transmitted therein (by one or more TRPs).

In some aspects, information associated with a given DCI communication that is unique to a TRP may be used in association with ensuring that each TRP included in a multi-TRP configuration is associated with a unique scrambling sequence. In some aspects, such information may include a CORESET identifier, a CORESET group identifier, or a CORESET pool index associated with the DCI communication.

Figure 10B:
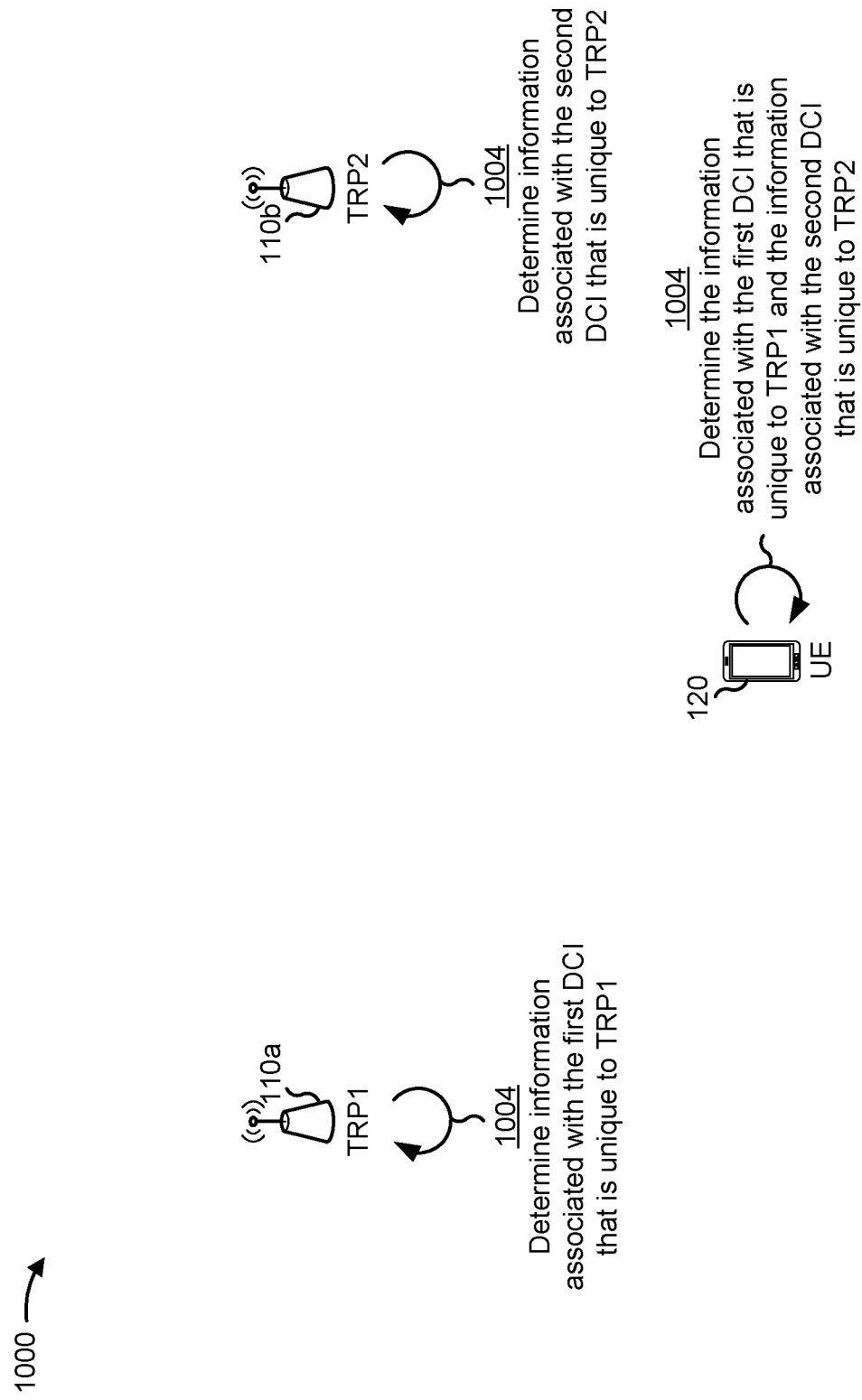

As shown in FIG. 10B, in a second operation 1004, TRP1 and UE 120 may each determine the information associated with the first DCI communication that is unique to TRP1, and TRP2 and UE 120 may each determine the information associated with the second DCI communication that is unique to TRP2. In some aspects, TRP1 may determine the information associated with the first communication that is unique to TRP1 based at least in part on determining the CORESET identifier corresponding to the CORESET in which UE 120 received the first DCI communication, based at least in part on determining the CORESET pool index corresponding to the CORESET in which UE 120 received the first DCI communication, or the like. Similarly, TRP2 may determine the information associated with the second DCI communication that is unique to TRP2 based at least in part on determining the CORESET identifier corresponding to the CORESET in which UE 120 received the second DCI communication, based at least in part on determining the CORESET pool index corresponding to the CORESET in which UE 120 received the second DCI communication, or the like.

In some aspects, UE 120 may be configured to determine the information associated with the first DCI communication, may receive from TRP1 an instruction to determine the information associated with the first DCI communication, or the like. For example, UE 120 may receive from TRP1 an instruction to determine the CORESET identifier corresponding to the CORESET in which UE 120 received the first DCI communication. Similarly, UE 120 may be configured to determine the information associated with the second DCI communication, may receive from TRP2 an instruction to determine the information associated with the second DCI communication, or the like.

Figure 10C:
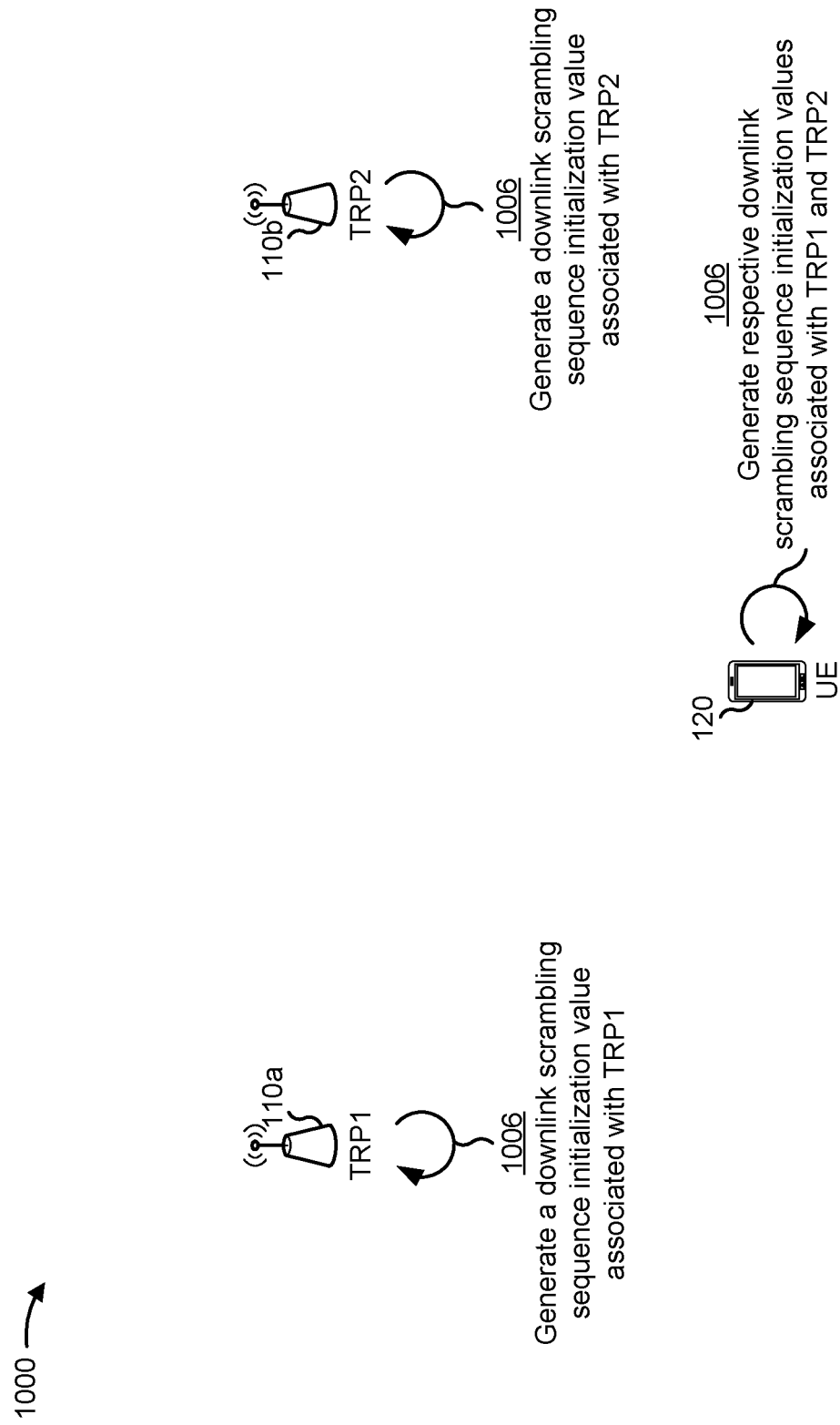

As shown in FIG. 10C, in a third operation 1006, TRP1 and UE 120 may each generate a downlink scrambling sequence initialization code associated with TRP1, and TRP2 and UE 120 may each generate a downlink scrambling sequence initialization code associated with TRP2. For example, TRP1 and UE 120 may each generate the downlink scrambling sequence initialization code associated with TRP1 based at least in part on the information associated with the first DCI communication (in other words, the information associated with the first DCI communication that is unique to TRP1, such as a CORESET identifier or a CORESET pool index associated with the first DCI communication); and TRP2 and UE 120 may each generate the downlink scrambling sequence initialization code associated with TRP2 based at least in part on the information associated with the second DCI communication (in other words, the information associated with the second DCI communication that is unique to TRP2, such as a CORESET identifier or a CORESET pool index associated with the second DCI communication). In this way, the downlink scrambling sequence initialization code associated with TRP1 and the downlink scrambling sequence initialization associated with TRP2 are different downlink scrambling sequence initialization codes, which ensures that the respective downlink scrambling sequences that are generated for TRP1 and TRP2 are different downlink scrambling sequences.

In some aspects, to generate a downlink scrambling sequence initialization code for TRP1, TRP1 and UE 120 may incorporate the information associated with the first DCI communication that is unique to TRP1 into Equation 1 above using one or more of the unused bits in the 32 available bits of the downlink scrambling sequence initialization code for TRP1. For example, TRP1 and UE 120 may select respective values for the unused bits based at least in part on the information associated with the first DCI communication. Similarly, TRP2 and UE 120 may incorporate the information associated with the second DCI communication into Equation 1 above using one or more of the unused bits in the 32 available bits of the downlink scrambling sequence initialization code for TRP2. For example, TRP2 and UE 120 may select respective values for the unused bits based at least in part on the information associated with the second DCI communication that is unique to TRP2. Accordingly, TRP1, TRP2, and UE 120 may each generate a downlink scrambling sequence initialization code according to Equation 2 provided above.

Because $n_{RNTI}$ occupies 16 bits of the 32 available bits, q occupies 1 bit of the 32 available bits, and $n_{ID}$ occupies 10 bits of the available 32 bits, there may be up to 5 unused bits that may be used for the information that is unique to the particular TRP. In some aspects, information associated with a given DCI communication (for example, a CORESET identifier or a CORESET pool index) may be included in one or more of the unused bits. Additionally or alternatively, the information associated with the given DCI communication may be included in a repurposed bit (for example, a bit typically used for another purpose, but repurposed to include the information associated with the DCI communication that is unique to the TRP). As a particular example, the information associated with the given DCI communication may be included in a q bit (in other words a bit associated with identifying a codeword index) because the q value in $c_{init}$ may not be used for multi-TRP operations where only one codeword is assigned to a TRP. In other words, in some cases, a repurposed bit (for example, the q bit) can be used to differentiate TRPs.

Figure 10D:
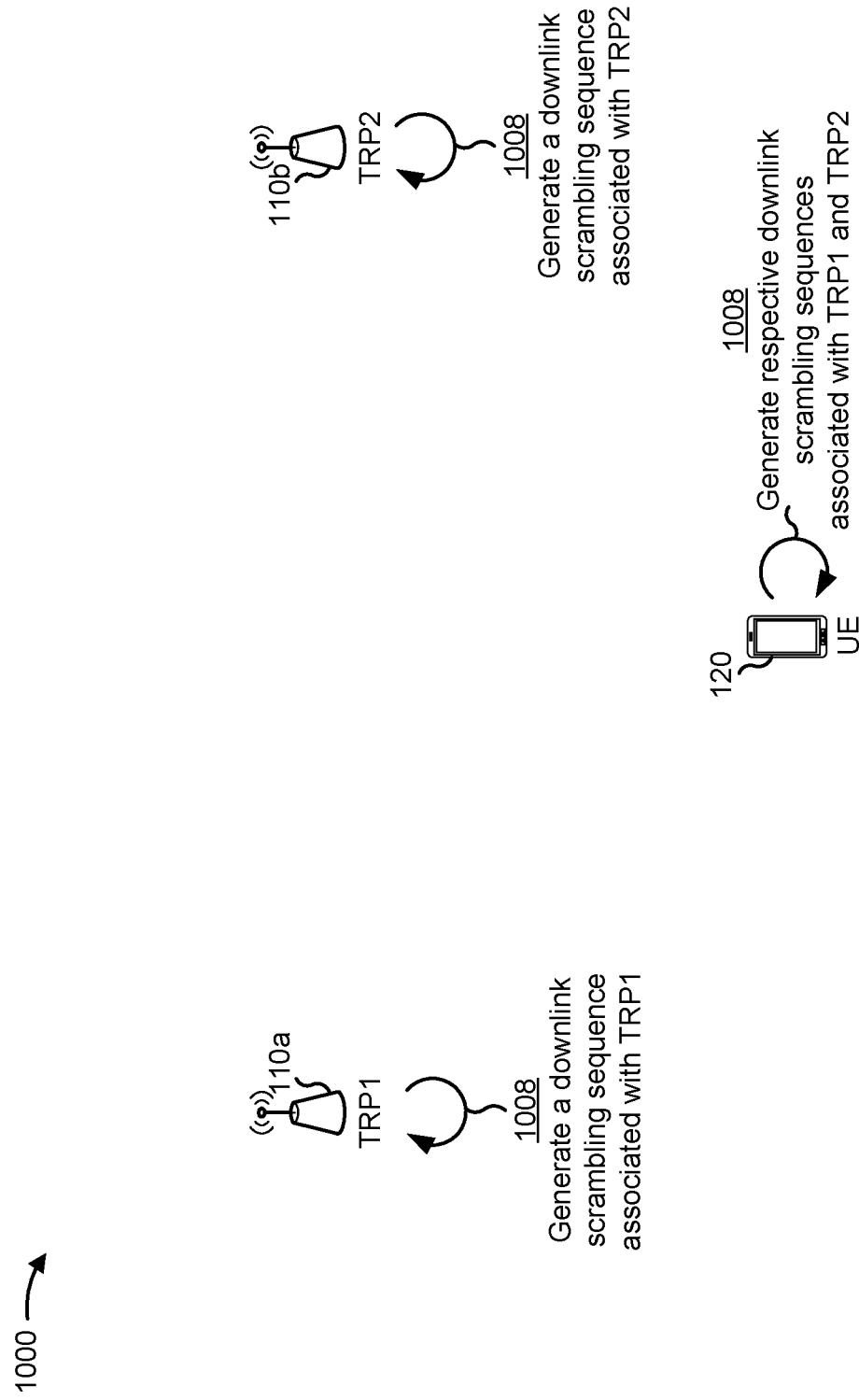

As shown in FIG. 10D, in a fourth operation 1008, TRP1 and UE 120 may each generate a downlink scrambling sequence associated with TRP1, and TRP2 and UE 120 may each generate a downlink scrambling sequence associated with TRP2. For example, TRP1 and UE 120 may each generate the downlink scrambling sequence associated with TRP1 based at least in part on the downlink scrambling sequence initiation code associated with TRP1; and TRP2 and UE 120 may each generate the downlink scrambling sequence initialization code associated with TRP2 based at least in part on the downlink scrambling sequence initiation code associated with TRP2.

To generate a downlink scrambling sequence for TRP1, TRP1 and UE 120 may each use the downlink scrambling sequence initiation code associated with TRP1 as an initializer in a downlink scrambling sequence generator, such as a linear feedback shift register, another type of additive or multiplicative shift register, or another type of pseudorandom sequence generator. Similarly, to generate a downlink scrambling sequence for TRP2, TRP2 and UE 120 may each use the downlink scrambling sequence initiation code associated with TRP2 as an initializer in a downlink scrambling sequence generator, such as a linear feedback shift register, or another type of additive or multiplicative shift register. In this way, the downlink scrambling sequence initialization code associated with TRP1, and the downlink scrambling sequence initialization associated with TRP2, are different downlink scrambling sequence initialization codes.

Figure 10E:
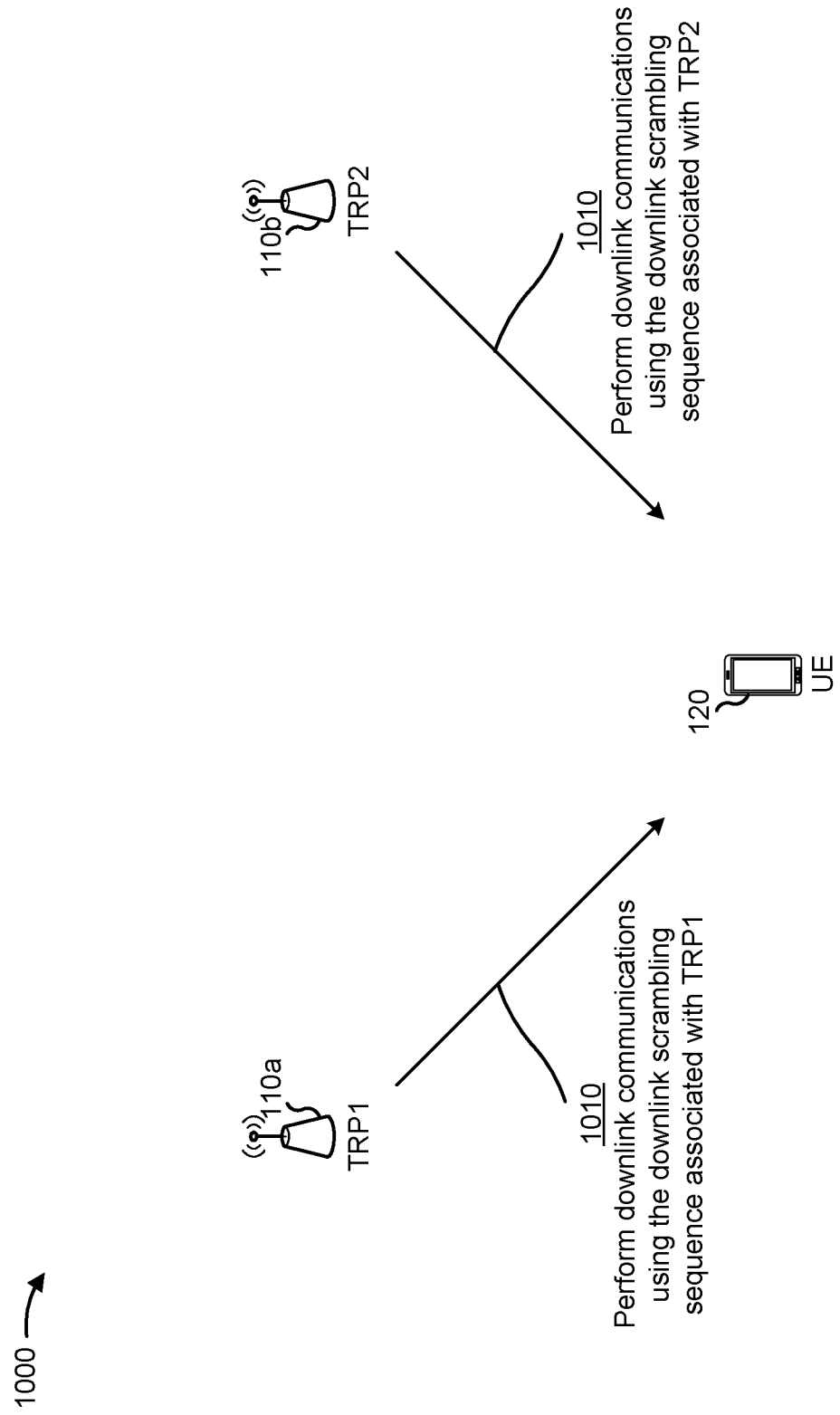

As shown in FIG. 10E, in a fifth operation 1010, TRP1, TRP2, and UE 120 may participate in downlink communications using the generated downlink scrambling sequences. For example, TRP1 may scramble a downlink communication (for example, by scrambling the data that is to be included in the downlink communication) using the downlink scrambling sequence associated with TRP1 (for example, that was generated by TRP1 based at least in part on the unique information associated with TRP1) and may transmit, to UE 120, the downlink communication via a downlink channel (for example, a physical downlink shared channel (PDSCH) on the downlink between TRP1 and UE 120). UE 120 may receive the downlink communication and may descramble the downlink communication (for example, by descrambling the data that is included in the downlink communication) using the downlink scrambling sequence associated with TRP1 (for example, that was generated by UE 120 based at least in part on the unique information associated with TRP1).

As another example, TRP2 may scramble a downlink communication (for example, by scrambling the data that is to be included in the downlink communication) using the downlink scrambling sequence associated with TRP2 (for example, that was generated by TRP2 based at least in part on the unique information associated with TRP2) and may transmit, to UE 120, the downlink communication via a downlink channel (for example, a physical downlink shared channel (PDSCH) on the downlink between TRP2 and UE 120). UE 120 may receive the downlink communication and may descramble the downlink communication (for example, by descrambling the data that is included in the downlink communication) using the downlink scrambling sequence associated with TRP2 (for example, that was generated by UE 120 based at least in part on the unique information associated with TRP2).

In this way, the downlink scrambling sequence associated with TRP1 is generated in a way that results in it being unique to TRP1, and the downlink scrambling sequence associated with TRP2 is generated in a way that results in it being unique to TRP2. In this way, if UE 120 is listening for a downlink communication from TRP2, UE 120 may identify interference being caused by TRP1 (for example, due to the unique downlink scrambling sequence associated with TRP1) and may perform interference rejection for the interference being caused by TRP1, which may result in increased performance on the wireless communication link between the UE and TRP2. Similarly, if UE 120 is listening for a downlink communication from TRP1, UE 120 may identify interference being caused by TRP2 (for example, due to the unique downlink scrambling sequence associated with TRP2) and may perform interference rejection for the interference being caused by TRP2, which may result in increased performance on the wireless communication link between the UE and TRP1.

Figure 11:
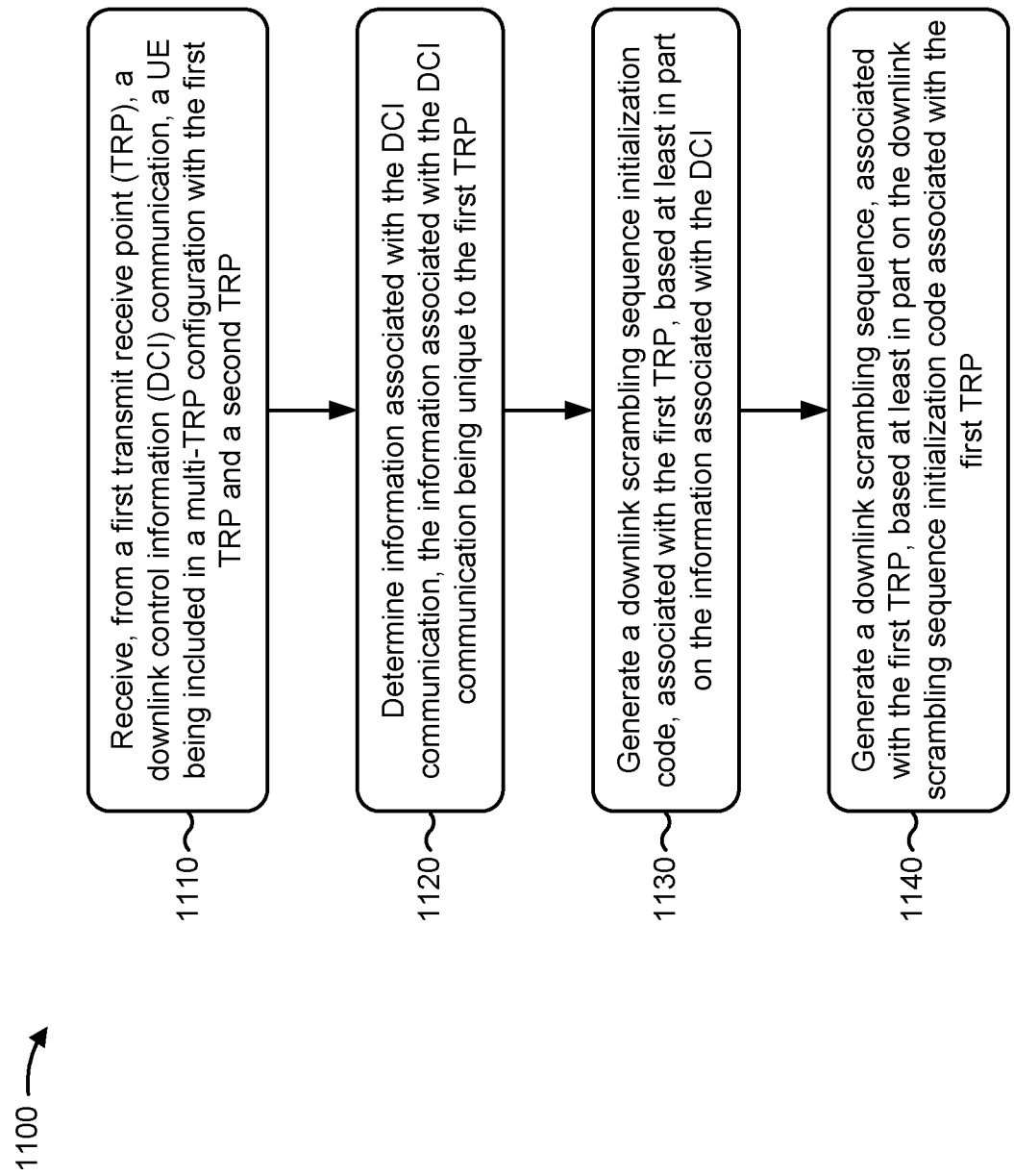
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example in which a UE (for example, UE 120 or the like) performs operations associated with scrambling sequence generation for a multi-TRP configuration.

As shown in FIG. 11, in some aspects, process 1100 may include receiving, from a first transmit receive point (TRP), a downlink control information (DCI) communication, the UE being included in a multi-TRP configuration with the first TRP and a second TRP (block 1110). For example, the UE (for example, using receive processor 258, controller/processor 280, memory 282, and/or the like) may receive, from a first TRP, a DCI communication, the UE being included in a multi-TRP configuration with the first TRP and a second TRP as described above.

As further shown in FIG. 11, in some aspects, process 1100 may include determining information associated with the DCI communication, the information associated with the DCI communication being unique to the first TRP (block 1120). For example, the UE (for example, using receive processor 258, controller/processor 280, memory 282, and/or the like) may determine information associated with the DCI communication, the information associated with the DCI communication being unique to the first TRP as described above.

As further shown in FIG. 11, in some aspects, process 1100 may include generating a downlink scrambling sequence initialization code associated with the first TRP based at least in part on the information associated with the DCI (block 1130). For example, the UE (for example, using receive processor 258, transmit processor 264, controller/processor 280, memory 282, and/or the like) may generate a downlink scrambling sequence initialization code associated with the first TRP based at least in part on the information associated with the DCI as described above.

As further shown in FIG. 11, in some aspects, process 1100 may include generating a downlink scrambling sequence associated with the first TRP based at least in part on the downlink scrambling sequence initialization code associated with the first TRP (block 1140). For example, the UE (for example, using receive processor 258, transmit processor 264, controller/processor 280, memory 282, and/or the like) may generate a downlink scrambling sequence associated with the first TRP based at least in part on the downlink scrambling sequence initialization code associated with the first TRP as described above.

Process 1100 may include additional aspects, such as any single implementation or any combination of aspects described below and/or in connection with one or more other processes described elsewhere herein.

In a first aspect, the UE may receive a downlink communication transmitted by the first TRP, and may descramble the downlink communication using the downlink scrambling sequence. In a second aspect, alone or in combination with the first aspect, the information associated with the DCI includes a control resource set (CORESET) identifier corresponding to a CORESET in which the DCI communication is received. Here, the CORESET identifier may be associated with a transmission configuration indication (TCI) that corresponds to the first TRP.

In a third aspect, alone or in combination with one or one or more of the first and second aspects, the information associated with the DCI includes a CORESET pool index associated with a CORESET in which the DCI communication is received. Here, the CORESET pool index may be associated with a TCI that corresponds to the first TRP.

In a fourth aspect, alone or in combination with any one or more of the first through third aspects, the downlink scrambling sequence initialization code includes a plurality of bits that is to be used in a pseudorandom sequence generator to generate the downlink scrambling sequence. Here, when generating the downlink scrambling sequence initialization code, the UE may select respective values of one or more bits of the plurality of bits based at least in part on the information associated with the DCI communication. In a fifth aspect, in combination with the fourth aspect, the one or more bits include at least one unused bit included in the plurality of bits.

In a sixth aspect, alone or in combination with any one or more of the fourth and fifth aspects, the one or more bits include at least one repurposed bit included in the plurality of bits. In a seventh aspect, in combination with the sixth aspect, the at least one repurposed bit is associated with identifying a codeword index.

FIG. 12 is a diagram illustrating an example process 1200 performed, for example, by a first TRP, in accordance with various aspects of the present disclosure. Example process 1200 is an example in which a first TRP (for example, TRP 508 configured on base station 110, or the like) performs operations associated with scrambling sequence generation for a multi-TRP configuration.

As shown in FIG. 12, in some aspects, process 1200 may include identifying information associated with a DCI communication to be transmitted to a UE included in a multi-TRP configuration with the first TRP and a second TRP, the information associated with the DCI being unique to the first TRP (block 1210). For example, the first TRP (for example, using transmit processor 220, controller/processor 240, memory 242, and/or the like) may identify information associated with a DCI communication to be transmitted to a UE (for example, UE 120) included in a multi-TRP configuration with the first TRP and a second TRP (for example, another TRP 508 configured on base station 110), the information associated with the DCI being unique to the first TRP as described above.

As further shown in FIG. 12, in some aspects, process 1200 may include generating a downlink scrambling sequence initialization code, associated with the first TRP, based at least in part on the information associated with the DCI (block 1220). For example, the first TRP (for example, using transmit processor 220, controller/processor 240, memory 242, and/or the like) may generate a downlink scrambling sequence initialization code associated with the first TRP based at least in part on the information associated with the DCI as described above.

As further shown in FIG. 12, in some aspects, process 1200 may include generating a downlink scrambling sequence associated with the first TRP based at least in part on the downlink scrambling sequence initialization code associated with the first TRP (block 1230). For example, the first TRP (for example, using transmit processor 220, controller/processor 240, memory 242, and/or the like) may generate a downlink scrambling sequence associated with the first TRP based at least in part on the downlink scrambling sequence initialization code associated with the first TRP as described above.

Process 1200 may include additional aspects, such as any single implementation or any combination of aspects described below and/or in connection with one or more other processes described elsewhere herein.

In a first aspect, the first TRP may scramble a downlink communication using the downlink scrambling sequence, and may transmit the downlink communication to the UE based at least in part on scrambling the downlink communication using the downlink scrambling sequence. In a second aspect, alone or in combination with the first aspect, the information associated with the DCI includes a CORESET identifier corresponding to a CORESET in which the DCI communication is to be transmitted. Here, the CORESET identifier may be associated with a TCI that corresponds to the first TRP.

In a third aspect, alone or in combination with any one or more of the first and second aspects, the information associated with the DCI includes a CORESET pool index associated with a CORESET in which the DCI communication is to be transmitted. Here, the CORESET pool index may be associated with a TCI that corresponds to the first TRP. In a fourth aspect, alone or in combination with any one or more of the first through third aspects, the downlink scrambling sequence initialization code includes a plurality of bits that is to be used, in a pseudorandom sequence generator, to generate the downlink scrambling sequence. Here, when generating the downlink scrambling sequence initialization code, the first TRP may select respective values of one or more bits of the plurality of bits based at least in part on the information associated with the DCI communication.

In a fifth aspect, in combination with the fourth aspect, the one or more bits include at least one unused bit included in the plurality of bits. In a sixth aspect, alone or in combination with any one or more of the fourth and fifth aspects, the one or more bits include at least one repurposed bit included in the plurality of bits. In a seventh aspect, in combination with the sixth aspect, the at least one repurposed bit is associated with identifying a codeword index.

FIG. 13 is a diagram illustrating an example process 1300 performed, for example, by a UE, in accordance with various aspects of the present disclosure. Example process 1300 is an example in which a UE (for example, UE 120 or the like) performs operations associated with scrambling sequence generation for a multi-TRP configuration.

As shown in FIG. 13, in some aspects, process 1300 may include receiving, from a first TRP, a DCI communication, the UE being included in a multi-TRP configuration with the first TRP and a second TRP (block 1310). For example, the UE (for example, using receive processor 258, controller/processor 280, memory 282, and/or the like) may receive, from a first TRP, a DCI communication, the UE being included in a multi-TRP configuration with the first TRP and a second TRP as described above.

As further shown in FIG. 13, in some aspects, process 1300 may include identifying information unique to the first TRP, the information unique to the first TRP being at least one of associated with the DCI communication or included in the DCI communication (block 1320). For example, the UE (for example, using receive processor 258, controller/processor 280, memory 282, and/or the like) may identify information unique to the first TRP as described above. In some aspects, the information unique to the first TRP is at least one of associated with the DCI communication or included in the DCI communication.

As further shown in FIG. 11, in some aspects, process 1100 may include generating a downlink scrambling sequence initialization code associated with the first TRP based at least in part on the information unique to the first TRP (block 1330). For example, the UE (for example, using receive processor 258, transmit processor 264, controller/processor 280, memory 282, and/or the like) may generate a downlink scrambling sequence initialization code associated with the first TRP based at least in part on the information unique to the first TRP as described above.

As further shown in FIG. 13, in some aspects, process 1300 may include generating a downlink scrambling sequence associated with the first TRP based at least in part on the downlink scrambling sequence initialization code associated with the first TRP (block 1340). For example, the UE (for example, using receive processor 258, transmit processor 264, controller/processor 280, memory 282, and/or the like) may generate a downlink scrambling sequence associated with the first TRP based at least in part on the downlink scrambling sequence initialization code associated with the first TRP as described above.

Process 1300 may include additional aspects, such as any single implementation or any combination of aspects described below and/or in connection with one or more other processes described elsewhere herein.

In a first aspect, the information unique to the first TRP is associated with the DCI communication and includes a CORESET identifier corresponding to a CORESET in which the DCI communication is received, wherein the CORESET identifier is associated with a TCI that corresponds to the first TRP. In a second aspect, alone or in combination with the first aspect, the information unique to the first TRP is associated with the DCI communication and includes a CORESET pool index associated with a CORESET in which the DCI communication is received, wherein the CORESET pool index is associated with a TCI that corresponds to the first TRP.

In a third aspect, alone or in combination with one or one or more of the first and second aspects, the information unique to the first TRP is included in the DCI communication and includes at least one of a DMRS sequence initialization code, associated with the first TRP, that is different from a DMRS sequence initialization code associated with the second TRP, a TCI value, associated with the first TRP, that is different from a TCI value associated with the second TRP, a HARQ process identifier, associated with the first TRP, that is different from a HARQ process identifier associated with the second TRP, or a HARQ process identifier set identifier, associated with the first TRP, that is different from a HARQ process identifier set identifier associated with the second TRP.

In a fourth aspect, alone or in combination with any one or more of the first through third aspects, the information unique to the first TRP is included in the DCI communication and comprises a HARQ process identifier, associated with the first TRP, that is different from a HARQ process identifier associated with the second TRP, wherein the HARQ process identifier, associated with the first TRP, is included in a HARQ process identifier set, associated with a HARQ process identifier set identifier, assigned to the first TRP, and wherein the HARQ process identifier, associated with the second TRP, is included in a HARQ process identifier set, associated with a HARQ process identifier set identifier, assigned to the second TRP. In a fifth aspect, alone or in combination with one or more of the first through fourth aspects, process 1300 includes receiving a downlink communication transmitted by the first TRP; and descrambling the downlink communication using the downlink scrambling sequence.

In a sixth aspect, alone or in combination with any one or more of the first through fifth aspects, the downlink scrambling sequence initialization code comprises a plurality of bits that is to be used, in a pseudorandom sequence generator, to generate the downlink scrambling sequence, and generating the downlink scrambling sequence initialization code comprises selecting respective values of one or more bits, of the plurality of bits, based at least in part on the information unique to the first TRP. In a seventh aspect, alone or in combination with one or more of the first through sixth aspects, the one or more bits include at least one unused bit included in the plurality of bits. In an eighth aspect, alone or in combination with one or more of the first through seventh aspects, the one or more bits includes at least one repurposed bit included in the plurality of bits. In a ninth aspect, alone or in combination with one or more of the first through eighth aspects, the at least one repurposed bit is associated with identifying a codeword index.

FIG. 14 is a diagram illustrating an example process 1400 performed, for example, by a first TRP, in accordance with various aspects of the present disclosure. Example process 1400 is an example in which a first TRP (for example, TRP 508 configured on base station 110, or the like) performs operations associated with scrambling sequence generation for a multi-TRP configuration.

As shown in FIG. 14, in some aspects, process 1400 may include identifying information unique to the first TRP, the information unique to the first TRP being at least one of associated with a DCI communication to be transmitted to a UE included in a multi-TRP configuration with the first TRP and a second TRP or included in the DCI communication (block 1410). For example, the first TRP (for example, using transmit processor 220, controller/processor 240, memory 242, and/or the like) may identify information unique to the first TRP as described above. In some aspects, the information unique to the first TRP is at least one of associated with a DCI communication to be transmitted to a UE included in a multi-TRP configuration with the first TRP and a second TRP or included in the DCI communication.

As further shown in FIG. 14, in some aspects, process 1400 may include generating a downlink scrambling sequence initialization code, associated with the first TRP, based at least in part on the information unique to the first TRP (block 1420). For example, the first TRP (for example, using transmit processor 220, controller/processor 240, memory 242, and/or the like) may generate a downlink scrambling sequence initialization code associated with the first TRP based at least in part on the information unique to the first TRP as described above.

As further shown in FIG. 14, in some aspects, process 1400 may include generating a downlink scrambling sequence associated with the first TRP based at least in part on the downlink scrambling sequence initialization code associated with the first TRP (block 1430). For example, the first TRP (for example, using transmit processor 220, controller/processor 240, memory 242, and/or the like) may generate a downlink scrambling sequence associated with the first TRP based at least in part on the downlink scrambling sequence initialization code associated with the first TRP, as described above.

Process 1400 may include additional aspects, such as any single implementation or any combination of aspects described below and/or in connection with one or more other processes described elsewhere herein.

In a first aspect, the information unique to the first TRP is associated with the DCI communication and includes a CORESET identifier corresponding to a CORESET in which the DCI communication is to be transmitted, wherein the CORESET identifier is associated with a TCI that corresponds to the first TRP. In a second aspect, alone or in combination with the first aspect, the information unique to the first TRP is associated with the DCI communication and includes a CORESET pool index associated with a CORESET in which the DCI communication is to be transmitted, wherein the CORESET pool index is associated with a TCI that corresponds to the first TRP.

In a third aspect, alone or in combination with one or more of the first and second aspects, the information unique to the first TRP is included in the DCI communication and comprises at least one of a DMRS sequence initialization code, associated with the first TRP, that is different from a DMRS sequence initialization code associated with the second TRP, a TCI value, associated with the first TRP, that is different from a TCI value associated with the second TRP, a HARQ process identifier, associated with the first TRP, that is different from a HARQ process identifier associated with the second TRP, or a HARQ process identifier set identifier, associated with the first TRP, that is different from a HARQ process identifier set identifier associated with the second TRP.

In a fourth aspect, alone or in combination with one or more of the first through third aspects, the information unique to the first TRP is included in the DCI communication and comprises a HARQ process identifier, associated with the first TRP, that is different from a HARQ process identifier associated with the second TRP, where the HARQ process identifier, associated with the first TRP, is included in a HARQ process identifier set, associated with a HARQ process identifier set identifier, assigned to the first TRP, and where the HARQ process identifier, associated with the second TRP, is included in a HARQ process identifier set, associated with a HARQ process identifier set identifier, assigned to the second TRP.

In a fifth aspect, alone or in combination with one or more of the first though fourth aspects, process 1400 includes scrambling a downlink communication using the downlink scrambling sequence, and transmitting the downlink communication to the UE based at least in part on scrambling the downlink communication using the downlink scrambling sequence. In a sixth aspect, alone or in combination with one or more of the first through fifth aspects, the downlink scrambling sequence initialization code comprises a plurality of bits that is to be used, in a pseudorandom sequence generator, to generate the downlink scrambling sequence, and generating the downlink scrambling sequence initialization code comprises selecting respective values of one or more bits, of the plurality of bits, based at least in part on the information unique to the first TRP. In a seventh aspect, alone or in combination with one or more of the first through sixth aspects, the one or more bits include at least one unused bit included in the plurality of bits. In an eighth aspect, alone or in combination with one or more of the first through seventh aspects, the one or more bits include at least one repurposed bit included in the plurality of bits. In a ninth aspect, alone or in combination with one or more of the first through eighth aspects, the at least one repurposed bit is associated with identifying a codeword index.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set.

A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving, from a first transmit receive point (TRP), a downlink control information (DCI) communication, the UE being included in a multi-TRP configuration with the first TRP and a second TRP;
    identifying information unique to the first TRP, the information unique to the first TRP being at least one of:
        associated with the DCI communication, or
        included in the DCI communication;
    generating a downlink scrambling sequence initialization code, associated with the first TRP, based at least in part on the information unique to the first TRP; and
    generating a downlink scrambling sequence, associated with the first TRP and different from the downlink scrambling sequence initialization code, based at least in part on the downlink scrambling sequence initialization code associated with the first TRP.

2. The method of claim 1, wherein the information unique to the first TRP is associated with the DCI communication and includes a control resource set (CORESET) identifier corresponding to a CORESET in which the DCI communication is received,
    wherein the CORESET identifier is associated with a transmission configuration indication (TCI) that corresponds to the first TRP.

3. The method of claim 1, wherein the information unique to the first TRP is associated with the DCI communication and includes a control resource set (CORESET) pool index associated with a CORESET in which the DCI communication is received,
    wherein the CORESET pool index is associated with a transmission configuration indication (TCI) that corresponds to the first TRP.

4. The method of claim 1, wherein the information unique to the first TRP is included in the DCI communication and includes at least one of:
    a demodulation reference signal (DMRS) sequence initialization code, associated with the first TRP, that is different from a DMRS sequence initialization code associated with the second TRP,
    a transmission configuration indication (TCI) value, associated with the first TRP, that is different from a TCI value associated with the second TRP,
    a hybrid automatic repeat request (HARQ) process identifier, associated with the first TRP, that is different from a HARQ process identifier associated with the second TRP, or
    a HARQ process identifier set identifier, associated with the first TRP, that is different from a HARQ process identifier set identifier associated with the second TRP.

5. The method of claim 1, wherein the information unique to the first TRP is included in the DCI communication and comprises:
    a hybrid automatic repeat request (HARQ) process identifier, associated with the first TRP, that is different from a HARQ process identifier associated with the second TRP,
        wherein the HARQ process identifier, associated with the first TRP, is included in a HARQ process identifier set, associated with a HARQ process identifier set identifier, assigned to the first TRP, and
        wherein the HARQ process identifier, associated with the second TRP, is included in a HARQ process identifier set, associated with a HARQ process identifier set identifier, assigned to the second TRP.

6. The method of claim 1, further comprising:
    receiving a downlink communication transmitted by the first TRP; and
    descrambling the downlink communication using the downlink scrambling sequence.

7. The method of claim 1, wherein the downlink scrambling sequence initialization code comprises a plurality of bits that are to be used, in a pseudorandom sequence generator, to generate the downlink scrambling sequence, and
    wherein generating the downlink scrambling sequence initialization code comprises:
        selecting respective values of one or more bits, of the plurality of bits, based at least in part on the information unique to the first TRP.

8. The method of claim 7, wherein the one or more bits include at least one unused bit included in the plurality of bits.

9. The method of claim 7, wherein the one or more bits include at least one repurposed bit included in the plurality of bits.

10. The method of claim 9, wherein the at least one repurposed bit is associated with identifying a codeword index.

11. A method of wireless communication performed by a first transmit receive point (TRP), comprising:
    identifying information unique to the first TRP, the information unique to the first TRP being at least one of:
        associated with a downlink control information (DCI) communication to be transmitted to a user equipment (UE) included in a multi-TRP configuration with the first TRP and a second TRP, or
        included in the DCI communication;
    generating a downlink scrambling sequence initialization code, associated with the first TRP, based at least in part on the information unique to the first TRP; and
    generating a downlink scrambling sequence, associated with the first TRP and different from the downlink scrambling sequence initialization code, based at least in part on the downlink scrambling sequence initialization code associated with the first TRP.

12. The method of claim 11, wherein the information unique to the first TRP is associated with the DCI communication and includes a control resource set (CORESET) identifier corresponding to a CORESET in which the DCI communication is to be transmitted,
wherein the CORESET identifier is associated with a transmission configuration indication (TCI) that corresponds to the first TRP.

13. The method of claim 11, wherein the information unique to the first TRP is associated with the DCI communication and includes a control resource set (CORESET) pool index associated with a CORESET in which the DCI communication is to be transmitted,
wherein the CORESET pool index is associated with a transmission configuration indication (TCI) that corresponds to the first TRP.

14. The method of claim 11, wherein the information unique to the first TRP is included in the DCI communication and comprises at least one of:
a demodulation reference signal (DMRS) sequence initialization code, associated with the first TRP, that is different from a DMRS sequence initialization code associated with the second TRP,
a transmission configuration indication (TCI) value, associated with the first TRP, that is different from a TCI value associated with the second TRP,
a hybrid automatic repeat request (HARQ) process identifier, associated with the first TRP, that is different from a HARQ process identifier associated with the second TRP, or
a HARQ process identifier set identifier, associated with the first TRP, that is different from a HARQ process identifier set identifier associated with the second TRP.

15. The method of claim 11, wherein the information unique to the first TRP is included in the DCI communication and comprises:
a hybrid automatic repeat request (HARQ) process identifier, associated with the first TRP, that is different from a HARQ process identifier associated with the second TRP,
wherein the HARQ process identifier, associated with the first TRP, is included in a HARQ process identifier set, associated with a HARQ process identifier set identifier, assigned to the first TRP, and
wherein the HARQ process identifier, associated with the second TRP, is included in a HARQ process identifier set, associated with a HARQ process identifier set identifier, assigned to the second TRP.

16. The method of claim 11, further comprising:
scrambling a downlink communication using the downlink scrambling sequence; and
transmitting the downlink communication to the UE based at least in part on scrambling the downlink communication using the downlink scrambling sequence.

17. The method of claim 11, wherein the downlink scrambling sequence initialization code comprises a plurality of bits that are to be used, in a pseudorandom sequence generator, to generate the downlink scrambling sequence, and
wherein generating the downlink scrambling sequence initialization code comprises:
selecting respective values of one or more bits, of the plurality of bits, based at least in part on the information unique to the first TRP.

18. The method of claim 17, wherein the one or more bits include at least one unused bit included in the plurality of bits.

19. The method of claim 17, wherein the one or more bits include at least one repurposed bit included in the plurality of bits.

20. The method of claim 19, wherein the at least one repurposed bit is associated with identifying a codeword index.

21. A user equipment (UE) for wireless communication, comprising:
a memory; and
one or more processors operatively coupled to the memory, wherein the one or more processors are configured to:
receive, from a first transmit receive point (TRP), a downlink control information (DCI) communication, the UE being included in a multi-TRP configuration with the first TRP and a second TRP;
identify information unique to the first TRP, the information unique to the first TRP being at least one of:
associated with the DCI communication, or
included in the DCI communication;
generate a downlink scrambling sequence initialization code, associated with the first TRP, based at least in part on the information unique to the first TRP; and
generate a downlink scrambling sequence, associated with the first TRP and different from the downlink scrambling sequence initialization code, based at least in part on the downlink scrambling sequence initialization code associated with the first TRP.

22. The UE of claim 21, wherein the information unique to the first TRP is associated with the DCI communication and includes a control resource set (CORESET) identifier corresponding to a CORESET in which the DCI communication is received,
wherein the CORESET identifier is associated with a transmission configuration indication (TCI) that corresponds to the first TRP.

23. The UE of claim 21, wherein the information unique to the first TRP is associated with the DCI communication and includes a control resource set (CORESET) pool index associated with a CORESET in which the DCI communication is received,
wherein the CORESET pool index is associated with a transmission configuration indication (TCI) that corresponds to the first TRP.

24. The UE of claim 21, wherein the information unique to the first TRP is included in the DCI communication and includes at least one of:
a demodulation reference signal (DMRS) sequence initialization code, associated with the first TRP, that is different from a DMRS sequence initialization code associated with the second TRP,
a transmission configuration indication (TCI) value, associated with the first TRP, that is different from a TCI value associated with the second TRP,
a hybrid automatic repeat request (HARQ) process identifier, associated with the first TRP, that is different from a HARQ process identifier associated with the second TRP, or
a HARQ process identifier set identifier, associated with the first TRP, that is different from a HARQ process identifier set identifier associated with the second TRP.

25. The UE of claim 21, wherein the information unique to the first TRP is included in the DCI communication and comprises:

a hybrid automatic repeat request (HARQ) process identifier, associated with the first TRP, that is different from a HARQ process identifier associated with the second TRP,
  wherein the HARQ process identifier, associated with the first TRP, is included in a HARQ process identifier set, associated with a HARQ process identifier set identifier, assigned to the first TRP, and
  wherein the HARQ process identifier, associated with the second TRP, is included in a HARQ process identifier set, associated with a HARQ process identifier set identifier, assigned to the second TRP.

26. A first transmit receive point (TRP) for wireless communication, comprising:
  a memory; and
  one or more processors operatively coupled to the memory, where the one or more processors are configured to:
    identify information unique to the first TRP, the information unique to the first TRP being at least one of: associated with a downlink control information (DCI) communication to be transmitted to a user equipment (UE) included in a multi-TRP configuration with the first TRP and a second TRP, or included in the DCI communication;
    generate a downlink scrambling sequence initialization code, associated with the first TRP, based at least in part on the information unique to the first TRP; and
    generate a downlink scrambling sequence, associated with the first TRP and different from the downlink scrambling sequence initialization code, based at least in part on the downlink scrambling sequence initialization code associated with the first TRP.

27. The first TRP of claim 26, wherein the information unique to the first TRP is associated with the DCI communication and includes a control resource set (CORESET) identifier corresponding to a CORESET in which the DCI communication is to be transmitted,
  wherein the CORESET identifier is associated with a transmission configuration indication (TCI) that corresponds to the first TRP.

28. The first TRP of claim 26, wherein the information unique to the first TRP is associated with the DCI communication and includes a control resource set (CORESET) pool index associated with a CORESET in which the DCI communication is to be transmitted,
  wherein the CORESET pool index is associated with a transmission configuration indication (TCI) that corresponds to the first TRP.

29. The first TRP of claim 26, wherein the information unique to the first TRP is included in the DCI communication and comprises at least one of:
  a demodulation reference signal (DMRS) sequence initialization code, associated with the first TRP, that is different from a DMRS sequence initialization code associated with the second TRP,
  a transmission configuration indication (TCI) value, associated with the first TRP, that is different from a TCI value associated with the second TRP,
  a hybrid automatic repeat request (HARQ) process identifier, associated with the first TRP, that is different from a HARQ process identifier associated with the second TRP, or
  a HARQ process identifier set identifier, associated with the first TRP, that is different from a HARQ process identifier set identifier associated with the second TRP.

30. The first TRP of claim 26, wherein the information unique to the first TRP is included in the DCI communication and comprises:
  a hybrid automatic repeat request (HARQ) process identifier, associated with the first TRP, that is different from a HARQ process identifier associated with the second TRP,
    wherein the HARQ process identifier, associated with the first TRP, is included in a HARQ process identifier set, associated with a HARQ process identifier set identifier, assigned to the first TRP, and
    wherein the HARQ process identifier, associated with the second TRP, is included in a HARQ process identifier set, associated with a HARQ process identifier set identifier, assigned to the second TRP.

* * * * *